United States Patent
Saito

(10) Patent No.: US 10,165,243 B2
(45) Date of Patent: Dec. 25, 2018

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventor: Taro Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 15/375,685

(22) Filed: Dec. 12, 2016

(65) Prior Publication Data

US 2017/0142387 A1 May 18, 2017

Related U.S. Application Data

(63) Continuation of application No. PCT/JP2015/062697, filed on Apr. 27, 2015.

(30) Foreign Application Priority Data

Jul. 16, 2014 (JP) ................. 2014-145794

(51) Int. Cl.
*H04N 9/73* (2006.01)
*H04N 5/235* (2006.01)
(Continued)

(52) U.S. Cl.
CPC ........... *H04N 9/735* (2013.01); *H04N 5/2256* (2013.01); *H04N 5/2351* (2013.01);
(Continued)

(58) Field of Classification Search
CPC ............. H04N 5/2256; H04N 5/23229; H04N 5/23245; H04N 5/2351; H04N 5/2354; H04N 9/735; G03B 15/05
See application file for complete search history.

(56) References Cited

U.S. PATENT DOCUMENTS 5,808,681 A * 9/1998 Kitajima ............... H04N 9/735
348/223.1
7,148,922 B2 * 12/2006 Shimada ............... H04N 9/735
348/224.1
(Continued)

FOREIGN PATENT DOCUMENTS

JP 8-340542 A 12/1996
JP 2000-307940 A 11/2000
(Continued)

OTHER PUBLICATIONS

International Preliminary Report on Patentability issued in PCT/JP2015/062697, dated Apr. 28, 2016.
(Continued)

*Primary Examiner* — Nhan T Tran
*Assistant Examiner* — Chriss Yoder, III
(74) *Attorney, Agent, or Firm* — Birch, Stewart, Kolasch & Birch, LLP

(57) ABSTRACT

An image processing unit (31) according to a preferred aspect of the invention includes an image acquisition unit (41) that acquires a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted, a ratio calculation unit (43) that calculates a ratio of the first image signal to the second image signal in each region, and a determination unit (45) that determines a main object region and a background region on the basis of a threshold value.

23 Claims, 17 Drawing Sheets

(51) Int. Cl.
  *H04N 5/225*  (2006.01)
  *H04N 5/232*  (2006.01)
  *G03B 15/05*  (2006.01)

(52) U.S. Cl.
  CPC ....... *H04N 5/2354* (2013.01); *H04N 5/23229* (2013.01); *G03B 15/05* (2013.01); *H04N 5/23245* (2013.01)

(56) References Cited

U.S. PATENT DOCUMENTS

| | | | | |
|---|---|---|---|---|
| 7,262,798 B2 * | 8/2007 | Stavely | ............... | H04N 5/232 348/140 |
| 8,174,611 B2 * | 5/2012 | Estevez | ............... | H04N 5/2351 348/222.1 |

FOREIGN PATENT DOCUMENTS

| | | | |
|---|---|---|---|
| JP | 2000-308068 A | 11/2000 | |
| JP | 2005-130268 A | 5/2005 | |
| JP | 2009-200924 A | 9/2009 | |
| JP | 2012-194269 A | 10/2012 | |

OTHER PUBLICATIONS

International Searching Report issued in PCT/JP2015/062697, dated Jul. 7, 2015.
Written Opinion of the International Searching Authority issued in PCT/JP2015/062697 (PCT/ISA/237), dated Jul. 7, 2015.

\* cited by examiner

FIG. 6A

| A1 (10)<br>F (1)<br>L (9) | A2 (10)<br>F (1)<br>L (9) | A3 (10)<br>F (1)<br>L (9) | A4 (10)<br>F (1)<br>L (9) | A5 (10)<br>F (1)<br>L (9) |
|---|---|---|---|---|
| B1 (10)<br>F (1)<br>L (9) | B2 (10)<br>F (1)<br>L (9) | B3 (10)<br>F (1)<br>L (9) | B4 (10)<br>F (1)<br>L (9) | B5 (10)<br>F (1)<br>L (9) |
| C1 (50)<br>F (25)<br>L (25) | C2 (50)<br>F (25)<br>L (25) | C3 (100)<br>F (90)<br>L (10) | C4 (100)<br>F (90)<br>L (10) | C5 (100)<br>F (90)<br>L (10) |
| D1 (50)<br>F (25)<br>L (25) | D2 (50)<br>F (25)<br>L (25) | D3 (100)<br>F (90)<br>L (10) | D4 (100)<br>F (90)<br>L (10) | D5 (100)<br>F (90)<br>L (10) |
| E1 (50)<br>F (25)<br>L (25) | E2 (50)<br>F (25)<br>L (25) | E3 (100)<br>F (90)<br>L (10) | E4 (100)<br>F (90)<br>L (10) | E5 (100)<br>F (90)<br>L (10) |

FIG. 6B

| A1 (1.56)<br>F (1)<br>L (0.56) | A2 (1.56)<br>F (1)<br>L (0.56) | A3 (1.56)<br>F (1)<br>L (0.56) | A4 (1.56)<br>F (1)<br>L (0.56) | A5 (1.56)<br>F (1)<br>L (0.56) |
|---|---|---|---|---|
| B1 (1.56)<br>F (1)<br>L (0.56) | B2 (1.56)<br>F (1)<br>L (0.56) | B3 (1.56)<br>F (1)<br>L (0.56) | B4 (1.56)<br>F (1)<br>L (0.56) | B5 (1.56)<br>F (1)<br>L (0.56) |
| C1 (26.56)<br>F (25)<br>L (1.56) | C2 (26.56)<br>F (25)<br>L (1.56) | C3 (96.3)<br>F (90)<br>L (0.63) | C4 (96.3)<br>F (90)<br>L (0.63) | C5 (96.3)<br>F (90)<br>L (0.63) |
| D1 (26.56)<br>F (25)<br>L (1.56) | D2 (26.56)<br>F (25)<br>L (1.56) | D3 (96.3)<br>F (90)<br>L (0.63) | D4 (96.3)<br>F (90)<br>L (0.63) | D5 (96.3)<br>F (90)<br>L (0.63) |
| E1 (26.56)<br>F (25)<br>L (1.56) | E2 (26.56)<br>F (25)<br>L (1.56) | E3 (96.3)<br>F (90)<br>L (0.63) | E4 (96.3)<br>F (90)<br>L (0.63) | E5 (96.3)<br>F (90)<br>L (0.63) |

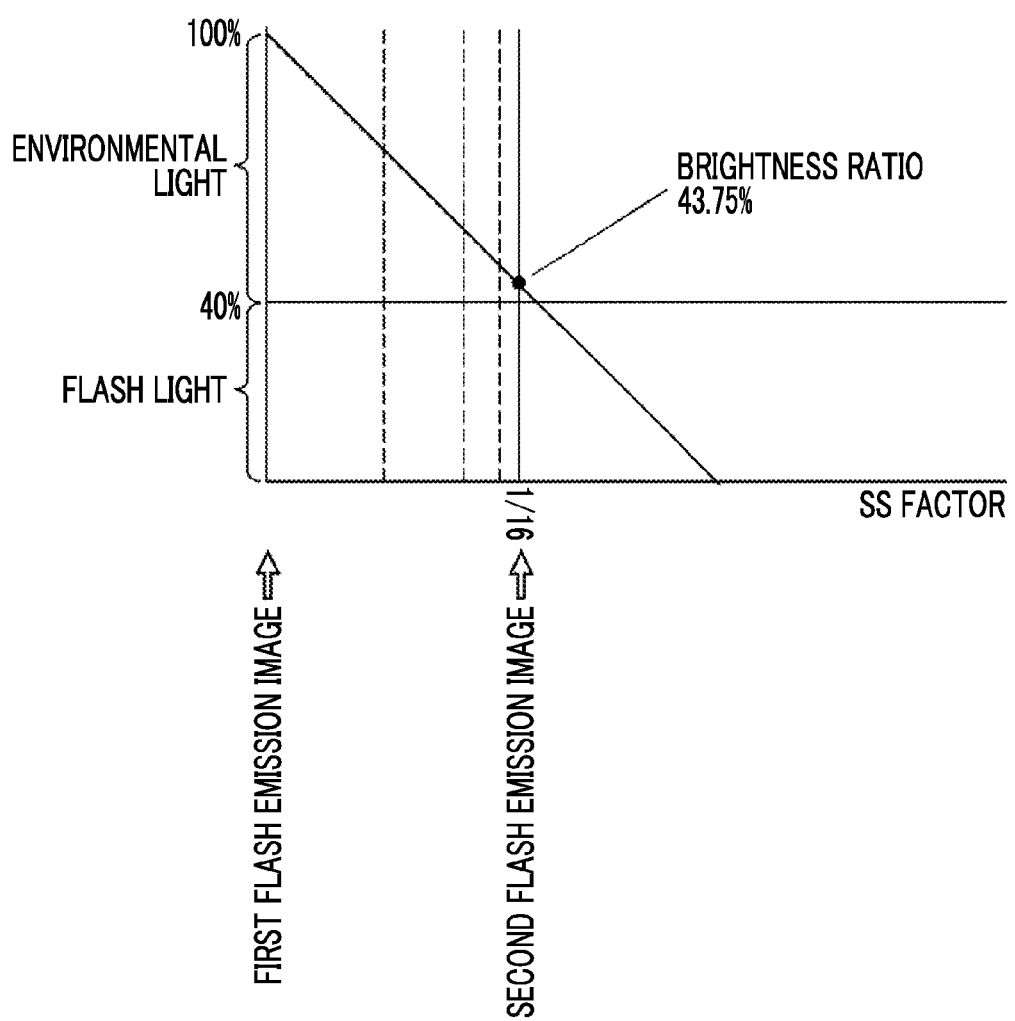

| SS FACTOR (TIMES) | 1 | 1/2 | 1/4 | 1/8 | 1/16 | 1/32 | 1/64 | 1/128 |
|---|---|---|---|---|---|---|---|---|
| ENVIRONMENTAL LIGHT (%) | 60.0 | 30.0 | 15.0 | 7.5 | 3.75 | 1.85 | 0.9375 | 0.46875 |
| FLASH LIGHT (%) | 40.0 | 40.0 | 40.0 | 40.0 | 40.0 | 40.0 | 40.0 | 40.0 |
| BRIGHTNESS RATIO (%) | 100 | 70 | 55 | 47.5 | 43.75 | 41.85 | 40.9375 | 40.46875 |

BRIGHTNESS INFORMATION RELATED TO FIRST FLASH IMAGE

BRIGHTNESS INFORMATION RELATED TO SECOND FLASH IMAGE

IMAGE PROCESSING DEVICE, IMAGING DEVICE, IMAGE PROCESSING METHOD, AND PROGRAM

CROSS-REFERENCE TO RELATED APPLICATIONS

This application is a Continuation of PCT International Application No. PCT/JP2015/062697 filed on Apr. 27, 2015, which claims priority under 35 U.S.C. § 119(a) to Japanese Patent Application No. 2014-145794 filed on Jul. 16, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, and a program, and more particularly, to a technique that separates a main object region from a background region in image data.

2. Description of the Related Art

In a case in which imaging is performed while flash light is emitted, a main object with a short object distance and a background with a long object distance are mainly affected by different light sources. That is, an image of the main object which has a short object distance and is likely to be irradiated with flash light is captured while being mainly affected by flash light and an image of the background which has a long object distance and is not likely to be irradiated with flash light is captured while being mainly affected by environmental light.

In a case in which the main object and the background are affected by different light sources, appropriate image processing needs to be performed for an image region including the main object (hereinafter, referred to as a "main object region") and an image region including the background (hereinafter, referred to as a "background region").

Specifically, in a case in which white balance processing (hereinafter, referred to as "WB processing") is performed to appropriately correct the color (color balance) of the main object region, a white balance gain (hereinafter, referred to as a "WB gain") for cancelling the influence of flash light needs to be applied to the main object region. In contrast, in a case in which WB processing is performed to appropriately correct the color (color balance) of the background region, a WB gain for cancelling the influence of environmental light needs to be applied to the background region. Therefore, in some cases, when a common WB gain is applied to the entire region of an image, it is difficult to appropriately correct both the color (color balance) of the main object region and the color (color balance) of the background region.

A method has been known which performs multi-area white balance processing (hereinafter, referred to as "multi-area WB processing") to apply different white balance gains (hereinafter, referred to as "WB gains") to a main object region and a background region. According to the multi-area WB processing, even in an image in which an object is irradiated with light components from a plurality of light sources at a different ratio in each region, it is possible to appropriately correct the color (color balance) of each region.

However, in a case in which multi-area WB processing is performed, it is necessary to accurately determine a main object region and a background region. When the main object region and the background region are inaccurately determined, an unnatural image is obtained. Therefore, in the related art, various methods for determining a main object region and a background region have been considered.

For example, as a technique for separating a main object region from a background region, JP2000-308068A discloses a method which acquires an image obtained by capturing a scene while emitting flash light and an image obtained by capturing the same scene without emitting flash light and separates a main object region from a background region on the basis of the difference between two acquired images.

JP2009-200924A discloses a method which acquires an image obtained by capturing a scene while increasing the emission intensity of flash light and an image obtained by capturing the same scene while decreasing the emission intensity of flash light and separates a main object region from a background region on the basis of the difference between two acquired images.

SUMMARY OF THE INVENTION

However, in the technique disclosed in JP2000-308068A, in a case in which a dark scene is captured without emitting flash light, it is necessary to decrease a shutter speed to obtain a sufficient amount of light such that blocked-up shadows are not generated. In an image which is captured at a low shutter speed, image blurring caused by the movement of a main object or image blurring caused by a camera shake is likely to occur. In a blurred image, since the boundary between a main object region and a background region is unclear, it is difficult to accurately separate the main object region from the background region.

When multi-area WB processing is performed for the image in which the main object region and the background region are not accurately separated from each other, an unnatural image is obtained.

In contrast, even in a case in which flash light is not emitted, when the shutter speed is maintained at a high level in order to prevent the occurrence of blurring, it is difficult to distinguish a captured image signal from noise in a region in which the amount of light (which is represented by, for example, a brightness value) is insufficient. When the shutter speed is increased from $\frac{1}{4}$ s to $\frac{1}{64}$ s, brightness obtained by environmental light is reduced to $\frac{1}{16}$. Specifically, when brightness is 70 in terms of 8 bits, 1/16 of the brightness is 4.375 and it is difficult to distinguish a region in which brightness is reduced to 4.375 from noise.

In the technique disclosed in JP2000-308068A, in some cases, it is difficult to accurately determine the main object region close to a light in the room. That is, in a case in which a plurality of persons are the main object, the brightness of a person who is close to a light in the room and is irradiated with flash light is not accurately represented by the upper limit of a dynamic range. Even in the main object region, the difference between a flash emission image and a flash non-emission image is equal to or less than a threshold value, which makes it difficult to accurately determine the main object region and the background region.

In the technique disclosed in JP2009-200924A, an image which is captured by a main imaging operation (an imaging operation with proper exposure) is not used to separate a main object region from a background region. That is, in the technique disclosed in JP2009-200924A, it is necessary to acquire the image captured by the main imaging operation, an image with a high emission intensity of flash light, and an image with a low emission intensity of flash light. Therefore, it is necessary to capture the same scene at least three times.

The invention has been made in view of the above-mentioned problems and an object of the invention is to provide an image processing device, an imaging device, an image processing method, and a program that can accurately determine a main object region and a background region, using images which are captured by two imaging operations including a main imaging operation and in which the influence of noise, blurring due to the movement of an object, and the influence of a camera shake are reduced.

According to an aspect of the invention, there is provided an image processing device comprising: an image acquisition unit that acquires a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted; a ratio calculation unit that calculates a ratio of the first image signal to the second image signal in each region of the second image signal corresponding to each region of the first image signal; and a determination unit that determines a main object region and a background region in the first flash emission image on the basis of the signal ratio and a threshold value.

According to this aspect, the main object region and the background region are determined on the basis of the signal ratio between two flash emission images obtained by capturing the same scene while emitting flash light. Therefore, the influence of noise, the influence of the shaking of the object, and the influence of a camera shake are reduced in an image and it is possible to accurately determine the main object region and the background region. In particular, according to this aspect, appropriate determination is performed at the boundary between the main object region and the background region. In addition, according to this aspect, since the image obtained by the main imaging operation is also used to determine the main object region and the background region, it is possible to perform the determination process for images which are obtained by at least two imaging operations including the main imaging operation.

Preferably, the ratio calculation unit acquires an amount of change in the first image signal and the second image signal in each region of the second image signal corresponding to each region of the first image signal and calculates, as the signal ratio, a ratio of the amount of change in the signals to a value based on the first image signal or the second image signal in each region, and the determination unit determines a region in which the signal ratio is equal to or less than the threshold value as the main object region and determines a region in which the signal ratio is greater than the threshold value as the background region in the first flash emission image.

According to this aspect, the amount of change in the signals in the first flash emission image and the second flash emission image is calculated and the main object region and the background region are determined on the basis of the signal ratio based on the amount of change in the signals. Therefore, according to this aspect, it is possible to accurately determine the main object region and the background region on the basis of the difference between the first flash emission image and the second flash emission image.

Preferably, the determination unit determines a region in which the signal ratio is equal to or greater than the threshold value as the main object region and determines a region in which the signal ratio is less than the threshold value as the background region in the first flash emission image.

According to this aspect, the main object region and the background region are determined on the basis of the threshold value. Therefore, it is possible to more accurately perform the determination process.

Preferably, the exposure time of the first flash emission image is longer than an emission time of the flash light.

According to this aspect, since the exposure time of the first flash emission image obtained by the main imaging operation is longer than the emission time of the flash light, it is possible to perform the determination process using an image which is obtained by the main imaging operation and in which sufficient brightness is ensured.

Preferably, the exposure time of the second flash emission image is shorter than the exposure time of the first flash emission image.

According to this aspect, since the exposure time of the second flash emission image obtained by the reference imaging operation is shorter than the exposure time of the first flash emission image obtained by the main imaging operation, it is possible to acquire the first flash emission image and the second flash emission image in a short time while ensuring a sufficient exposure time in the main imaging operation.

Preferably, the exposure time of the first flash emission image is determined from proper exposure of the first flash emission image.

According to this aspect, since the first flash emission image is captured with proper exposure, it is possible to perform the determination process using the first flash emission image with high quality.

Preferably, the image processing device further comprises a signal processing unit that performs different types of signal processing for the main object region and the background region determined by the determination unit.

According to this aspect, since different types of signal processing are performed for the determined main object region and background region, it is possible to perform appropriate image processing according to the main object region and the background region.

Preferably, the signal processing unit performs different types of white balance processing for the main object region and the background region.

According to this aspect, since white balance processing performed for the main object region is different from white balance processing performed for the background region, it is possible to perform white balance processing suitable for the light sources of the main object region and the background region.

Preferably, the image processing device further comprises a brightness information acquisition unit that acquires brightness information of the first flash emission image and brightness information of the second flash emission image and a brightness information comparison unit that compares the brightness information of the first flash emission image with the brightness information of the second flash emission image. Preferably, the signal processing unit does not perform the signal processing on the basis of a comparison result of the brightness information comparison unit.

According to this aspect, different types of signal processing are not performed for the main object region and the background region on the basis of the result of the comparison between the brightness information of the first flash emission image and the brightness information of the second flash emission image. Therefore, according to this aspect, in a case in which determination is not appropriately performed, for example, in a case in which an object has moved in the first flash emission image and the second flash emission image, it is possible to prevent deterioration of image quality due to signal processing.

Preferably, the brightness information comparison unit calculates an overlap between the brightness information of the first flash emission image and the brightness information of the second flash emission image to perform the comparison.

According to this aspect, since the comparison is performed by the overlap between the brightness information of the first flash emission image and the brightness information of the second flash emission image, it is possible to check whether the main object has moved in the first flash emission image and the second flash emission image.

Preferably, in a case in which a shutter speed at which the first flash emission image and the second flash emission image are captured is shorter than the emission time of the flash light, the signal processing unit does not perform the signal processing.

According to this aspect, in a case in which the shutter speed of the first flash emission image and the second flash emission image is shorter than the emission time of the flash light, the signal processing unit does not perform different types of signal processing for the main object region and the background region. For example, in a case in which a focal-plain shutter is used at a high shutter speed, a first curtain starts to move down and then a second curtain starts to move down. As a result, flash light does not uniformly reach the entire imaging surface. Therefore, brightness unevenness occurs in the flash emission image. For this reason, according to this aspect, since different types of signal processing are not performed for the main object region and the background region, it is possible to prevent the deterioration of image quality due to signal processing.

Preferably, in a case in which the first flash emission image is captured and then the second flash emission image is captured, the first flash emission image is captured at a flash emission time corresponding to rear curtain synchronization and the second flash emission image is captured at a flash emission time corresponding to front curtain synchronization.

According to this aspect, in a case in which the first flash emission image is captured and then the second flash emission image is captured, the first flash emission image is captured in a rear curtain synchronization mode and the second flash emission image is captured in a front curtain synchronization mode. Therefore, a change in the main object or a scene is prevented and it is possible to accurately determine the main object region and the background region.

Preferably, in a case in which the second flash emission image is captured and then the first flash emission image is captured, the first flash emission image is captured at a flash emission time corresponding to front curtain synchronization and the second flash emission image is captured at a flash emission time corresponding to rear curtain synchronization.

According to this aspect, in a case in which the second flash emission image is captured and then the first flash emission image is captured, the second flash emission image is captured in the rear curtain synchronization mode and the first flash emission image is captured in the front curtain synchronization. Therefore, a change in the main object or a scene is prevented and it is possible to accurately determine the main object region and the background region.

Preferably, in a case in which the second flash emission image and the first flash emission image are captured in this order and the first flash emission image is captured at a flash emission time corresponding to front curtain synchronization, the exposure time of the second flash emission image is shorter than the exposure time of the first flash emission image.

According to this aspect, in a case in which the second flash emission image is captured and then the first flash emission image is captured in the front curtain synchronization mode, the exposure time of the second flash emission image is shorter than the exposure time of the first flash emission image. Therefore, according to this aspect, since the time required to capture the first flash emission image as the mainly captured image is short, it is possible to acquire the main imaging image that the user intends.

Preferably, the second flash emission image is captured at a flash emission time corresponding to rear curtain synchronization.

According to this aspect, in a case in which the second flash emission image is captured in the rear curtain synchronization mode and then the first flash emission image is captured in the front curtain synchronization mode, the exposure time of the second flash emission image is shorter than the exposure time of the first flash emission image. Therefore, according to this aspect, a change in the main object or a scene is prevented and it is possible to accurately determine the main object region and the background region.

Preferably, in a case in which the first flash emission image and the second flash emission image are captured in this order and the first flash emission image is captured at a flash emission time corresponding to rear curtain synchronization, the exposure time of the second flash emission image is shorter than the exposure time of the first flash emission image.

According to this aspect, in a case in which the first flash emission image is captured and then the second flash emission image is captured in the rear curtain synchronization mode, the exposure time of the second flash emission image is shorter than the exposure time of the first flash emission image. Therefore, according to this aspect, after the first flash emission image is captured as the mainly captured image, the reference imaging operation is finished quickly. Therefore, user convenience is improved.

Preferably, the second flash emission image is captured at a flash emission time corresponding to front curtain synchronization.

According to this aspect, in a case in which, after the first flash emission image is captured in the rear curtain synchronization mode, the second flash emission image is captured in the front curtain synchronization mode, the exposure time of the second flash emission image is shorter than the exposure time of the first flash emission image. Therefore, according to this aspect, since the determination process can be performed using an image in which a change in the main object or a scene is prevented, it is possible to accurately determine the main object region and the background region.

Preferably, the amount of flash light emitted is set to the same value in the first flash emission image and the second flash emission image.

According to this aspect, since the amount of flash light emitted is set to the same value in the first flash emission image and the second flash emission image, it is possible to accurately determine the main object region and the background region.

Preferably, each region of the first image signal and the second image signal is one pixel.

According to this aspect, since the process of determining the main object region and the background region is performed for each pixel, it is possible to more accurately perform the determination process.

According to another aspect of the invention, there is provided an imaging device comprising the above-mentioned image processing device.

Preferably, the imaging device further comprises a camera shake sensor that detects a camera shake. Preferably, in a case in which at least one of the first flash emission image and the second flash emission image is captured and the camera shake sensor detects the camera shake, the determination unit does not determine the main object region and the background region.

According to this aspect, in a case in which the camera shake sensor detects the camera shake, the determination unit does not perform the determination process. Therefore, according to this aspect, it is possible to ensure the accuracy of the determination process performed by the determination unit.

According to still another aspect of the invention, there is provided an image processing method comprising: an image acquisition step of acquiring a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted; a ratio calculation step of calculating a ratio of the first image signal to the second image signal in each region of the second image signal corresponding to each region of the first image signal; and a determination step of determining a main object region and a background region in the first flash emission image on the basis of the signal ratio and a threshold value.

According to yet another aspect of the invention, there is provided a program that causes a computer to perform: an image acquisition step of acquiring a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted; a ratio calculation step of calculating a ratio of the first image signal to the second image signal in each region of the second image signal corresponding to each region of the first image signal; and a determination step of determining a main object region and a background region in the first flash emission image on the basis of the signal ratio and a threshold value.

According to the invention, the main object region and the background region are determined using at least two flash emission images captured by imaging operations including the main imaging operation which capture the same scene. Therefore, the influence of noise, the influence of the shaking of an object, and the influence of a camera shake in the image are reduced and it is possible to accurately determine the main object region and the background region.

BRIEF DESCRIPTION OF THE DRAWINGS

FIGS. 6A and 6B are diagrams illustrating the calculation of the signal ratio.

FIG. 7 is a diagram illustrating the ratio of brightness of a first flash emission image to brightness of a second flash emission image.

DESCRIPTION OF THE PREFERRED EMBODIMENTS

Embodiments of the invention will be described with reference to the accompanying drawings. In the following embodiments, an example in which the invention is applied to a digital camera (imaging device) will be described. However, the invention can be applied to an image processing device, an imaging device, an image processing method, and a program, in addition to the digital camera.

Figure 1:
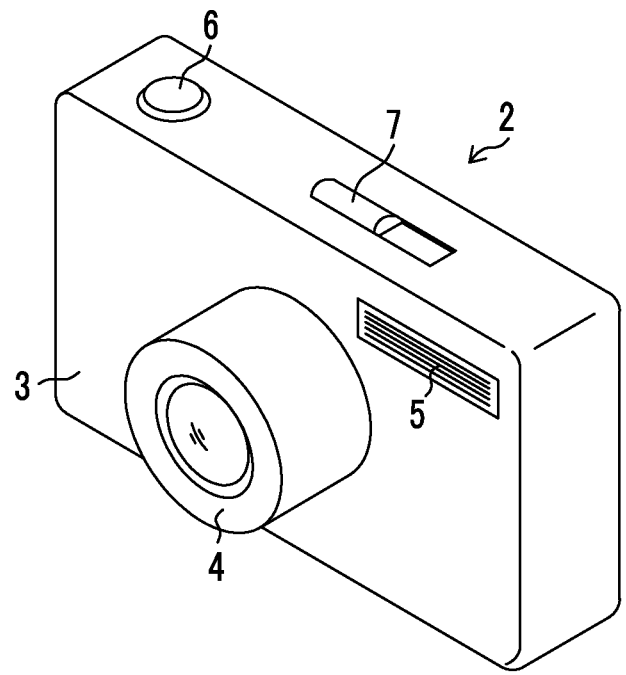
FIG. 1 is a front perspective view illustrating a digital camera.
Figure 2:
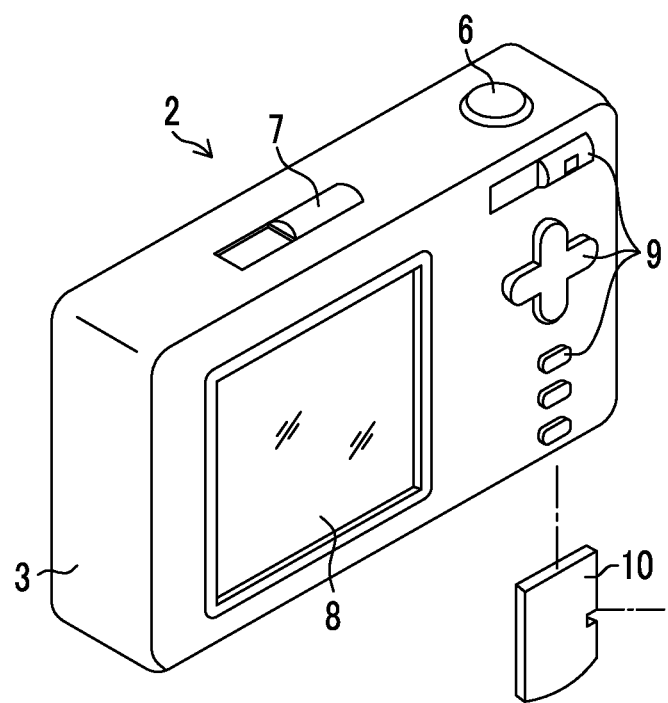
FIG. 2 is a rear perspective view illustrating the digital camera.

FIG. 1 is a front perspective view illustrating a digital camera 2. FIG. 2 is a rear perspective view illustrating the digital camera 2.

The digital camera 2 comprises a camera body 3 and a lens barrel 4 that is attached to a front surface of the camera body 3. The camera body 3 and the lens barrel 4 may be integrally provided or may be detachably and attachably provided as an interchangeable lens camera.

In addition to the lens barrel 4, a flash light emitting unit 5 is provided on the front surface of the camera body 3. A shutter button 6 and a power switch 7 are provided on an upper surface of the camera body 3. The shutter button 6 is an imaging instruction unit that receives an imaging instruction from a user. The power switch 7 is a power switching unit that receives an instruction to turn on and off the digital camera 2 from the user.

display unit 8 which is, for example, a liquid crystal panel and an operating unit 9 which is directly operated by the user are provided on a rear surface of the camera body 3. The display unit 8 displays a live view image (through-image) in an imaging standby state to function as an electronic viewfinder and functions as a playback image display unit when a captured image or a memory-stored image is played back.

The operating unit 9 is an arbitrary operating device, such as a mode switch, a cross key, and an execution key. For example, the mode switch is operated by the user to switch the operation mode of the digital camera 2. Examples of the operation mode of the digital camera 2 include an imaging mode in which an image of an object is captured to obtain a captured image and a playback mode in which an image is played back and displayed. Examples of the imaging mode include an auto focus (AF) mode in which auto focus is performed and a manual focus (MF) mode in which a manual focus operation is performed. The cross key and the execution key are operated by the user to display a menu screen or a setting screen on the display unit 8, to move a cursor displayed on the menu screen or the setting screen, or to confirm various types of settings of the digital camera 2.

A memory slot into which a main memory 10 is inserted and a cover that opens and closes an opening of the memory slot are provided at the bottom (not illustrated) of the camera body 3. The main memory 10 is detachably and attachably provided in the camera body 3. When the main memory 10 is inserted into the camera body 3, it is electrically connected to a storage control unit 33 provided in the camera body 3. The main memory 10 can be generally a semiconductor memory, such as a card-type flash memory. The main memory 10 is not particularly limited. For example, a recording medium of an arbitrary storage type, such as a magnetic medium, can be used as the main memory 10.

Figure 3:
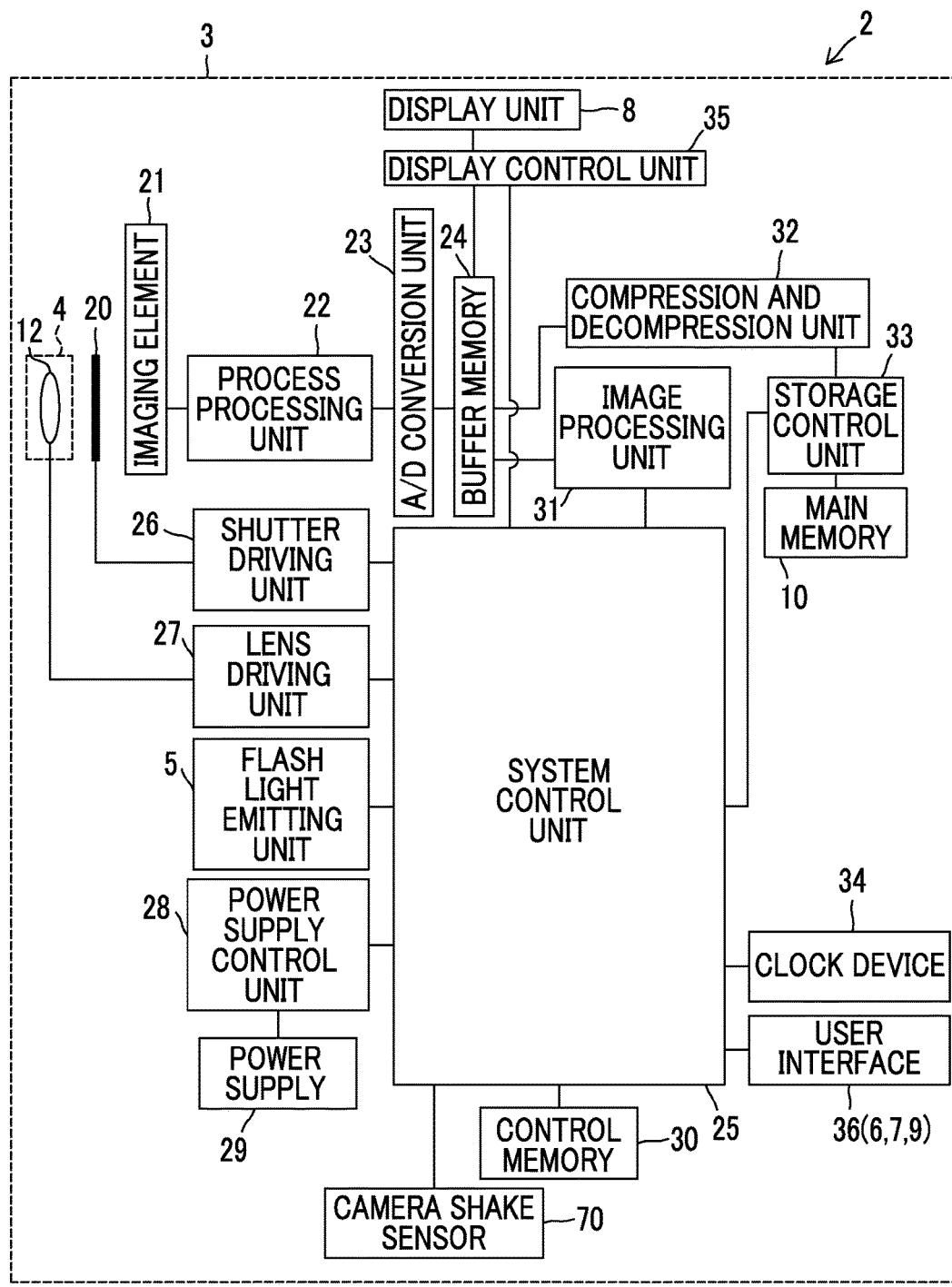
FIG. 3 is a block diagram illustrating a control processing system of the digital camera.

FIG. 3 is a block diagram illustrating a control processing system of the digital camera 2.

Object light passes through a lens unit 12 that is provided in the lens barrel 4 and a mechanical shutter 20 that is provided in the camera body 3 and is received by an imaging element 21. The lens unit 12 is formed by an imaging optical system including an imaging lens (lens group) and a diaphragm. The imaging element 21 is an element that receives the object image and generates an image signal and includes color filters, such as red, green, and blue (R, G, and B) filters, and an image sensor, such as a charge coupled device (CCD) or a complementary metal oxide semiconductor (CMOS), which converts an optical image into an electric signal. For example, an automatic gain control (AGC) circuit of a process processing unit 22 performs process processing for the image signal that is output from the imaging element 21 and an A/D conversion unit 23 converts an analog image signal into a digital image signal. The digital image signal is stored in a buffer memory 24.

The buffer memory 24 is an area that temporarily stores the image signal and is, for example, a dynamic random access memory (DRAM). The image signal that has been transmitted from the A/D conversion unit 23 and then stored in the buffer memory 24 is read by an image processing unit (image processing device) 31 which is controlled by a system control unit 25. The image processing unit 31 performs various types of image processing, such as a gamma correction process and a demosaicing process, using the image signal generated by the imaging element 21 as an input image signal, and stores the image signal subjected to the image processing in the buffer memory 24 again.

The image signal which has been subjected to the image processing by the image processing unit 31 and then stored in the buffer memory 24 is read by a display control unit 35 and a compression and decompression unit 32. The display control unit 35 controls the display unit 8 such that the image signal read from the buffer memory 24 is displayed on the display unit 8. As such, the image signal which has been output from the imaging element 21 and then subjected to the image processing by the image processing unit 31 is displayed as an imaging check image (post-view image) on the display unit 8.

The compression and decompression unit 32 compresses the image signal read from the buffer memory 24 to create an image signal with an arbitrary compression format, such as Joint Photographic Experts Group (JPEG) or Tagged Image File Format (TIFF). The compressed image signal is stored in the main memory 10 by the storage control unit 33 that controls a process of storing the image signal in the main memory 10 and a process of reading the image signal from the main memory 10. In a case in which data, such as an image signal, is stored in the main memory 10, the storage control unit 33 adds imaging condition information to the image signal, on the basis of the imaging conditions acquired from the system control unit 25. The imaging condition information is added to the image signal in any format. For example, an exchangeable image file format (Exif) can be used.

In the playback mode in which the image signal stored in the main memory 10 is played back, the image signal stored in the main memory 10 is read by the storage control unit 33 that is controlled by the system control unit 25, is decompressed by the compression and decompression unit 32, and is then stored in the buffer memory 24. The image signal is read from the buffer memory 24 by the display control unit 35 and is played back and displayed on the display unit 8 in the same order as that in which a captured image is checked and displayed.

The system control unit 25 controls the buffer memory 24, the image processing unit 31, and the storage control unit 33 as described above. In addition, the system control unit 25 controls other units in the digital camera 2. For example, the system control unit 25 controls a lens driving unit 27 to control the driving of the lens unit 12 and controls a shutter driving unit 26 to control the driving of the mechanical shutter 20. In addition, the system control unit 25 controls the imaging element 21 to control the output of an image signal. Further, the system control unit 25 controls the flash light emitting unit 5 to control the emission or non-emission of flash light, and controls a power control unit 28 to detect, for example, whether a battery is mounted on a power supply 29, the type of battery, and a remaining battery level. The detection of the remaining battery level in the power control unit 28 is performed by a remaining battery level sensor, which is not illustrated in the drawings. Furthermore, the system control unit 25 acquires date and time information which is counted by a clock device 34 and uses the date and time information in various types of processes. In addition, the system control unit 25 controls various processing units forming the image processing unit 31, controls a camera shake sensor 70, and controls each unit on the basis of the detection result of the camera shake sensor 70.

The system control unit 25 acquires an operation signal from a user interface 36 including the shutter button 6, the power switch 7, and the operating unit 9 and performs various types of processes and device control corresponding to the operation signal. For example, the system control unit 25 controls the shutter driving unit 26 to control the opening and closing of the mechanical shutter 20 in response to a release signal received from the shutter button 6. Furthermore, the system control unit 25 controls the power control unit 28 to control the turn-on and tune-off of the power supply 29 in response to a power on/off signal received from the power switch 7.

Programs and data required for various types of processes and device control performed by the system control unit 25 are stored in a control memory 30. The system control unit 25 can read the programs or the data stored in the control memory 30, if necessary. In addition, the system control unit 25 can store a new program or data in the control memory 30. For example, the system control unit 25 can write condition data, such as the type of set white balance mode (hereinafter, referred to as a "WB mode") or a white balance gain (hereinafter, referred to as a "WB gain"), to the control memory 30. The system control unit 25 can control the display control unit 35 such that various kinds of information acquired from each unit are displayed on the display unit 8. In addition, the system control unit 25 can change various kinds of information to be displayed on the display unit 8, in response to an operation signal which is input from the user through the user interface 36.

First Embodiment

Next, an image processing unit 31 according to a first embodiment will be described. The image processing unit 31 according to this embodiment determines a main object region and a background region in two images which are obtained by capturing the same scene while emitting flash light.

Figure 4:
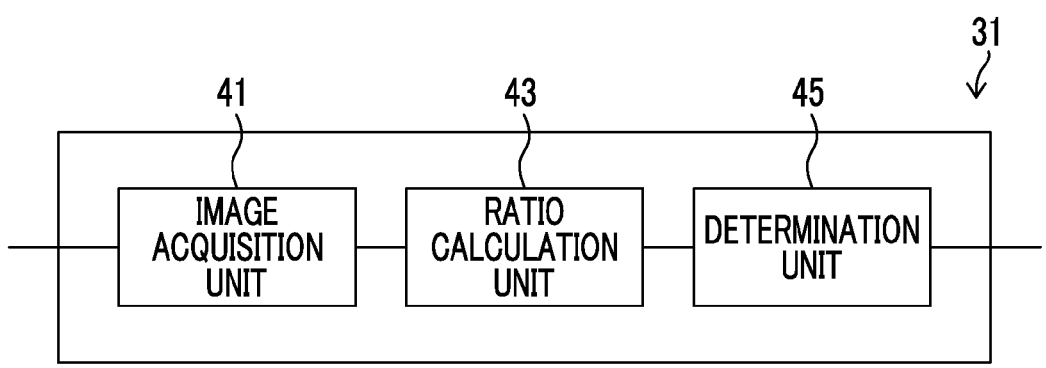
FIG. 4 is a block diagram illustrating an image processing unit according to a first embodiment.

FIG. 4 is a block diagram illustrating the image processing unit 31 according to the first embodiment. The image processing unit 31 comprises an image acquisition unit 41, a ratio calculation unit 43, and a determination unit 45.

The image acquisition unit 41 acquires a first image signal and a second image signal from the buffer memory 24. Here, the first image signal is a signal indicating a first flash emission image that is captured by a main imaging operation while flash light is emitted from the flash light emitting unit 5. The main imaging operation is an operation that captures an image intended to be recorded as a captured image in the main memory 10 and is performed under proper imaging conditions. The second image signal is a signal indicating a second flash emission image that is captured by a reference imaging operation with an exposure time different from the exposure time of the first image signal while flash light is emitted from the flash light emitting unit 5. The reference imaging operation is an imaging operation other than the main imaging operation and may not be necessarily performed under proper imaging conditions. The exposure time is the time for which charge corresponding to light received by the imaging element 21 is stored and corresponds to a shutter speed.

For example, information about the imaging conditions is given in the Exif format to the first image signal and the second image signal acquired by the image acquisition unit 41, as described above. Here, the imaging conditions mean various conditions which are considered when an image is captured and include information that is given to the image signal in the Exif format which is generally known. For example, the imaging conditions include a diaphragm value (F-number), an ISO speed, a shutter speed, information about whether flash light is emitted, the setting of the emission intensity of flash light, the emission time of flash light, and the setting of the amount of flash light emitted.

The ratio calculation unit 43 calculates the ratio of the first image signal to the second image signal in each region. A detailed signal ratio calculation process of the ratio calculation unit 43 will be described below.

The determination unit 45 determines the main object region and the background region in the first flash emission image on the basis of the signal ratio calculated by the ratio calculation unit 43 and a threshold value. For example, the determination unit 45 determines a region in which the signal ratio is equal to or greater than the threshold value as the main object region and determines a region in which the signal ratio is less than the threshold value as the background region. In addition, the determination unit 45 may determine a region in which the signal ratio is equal to or less than the threshold value as the main object region and determine a region in which the signal ratio is greater than the threshold value as the background, according to a signal ratio calculation method. A detailed threshold value determination method will be described below.

<Signal Ratio>

Next, the calculation of the signal ratio by the ratio calculation unit 43 will be described. First, the relationship between a change in the amount of light of the first flash emission image and a change in the amount of light of the second flash emission image will be described with reference to FIGS. 5A and 5B and FIGS. 6A and 6B.

Figure 5B:
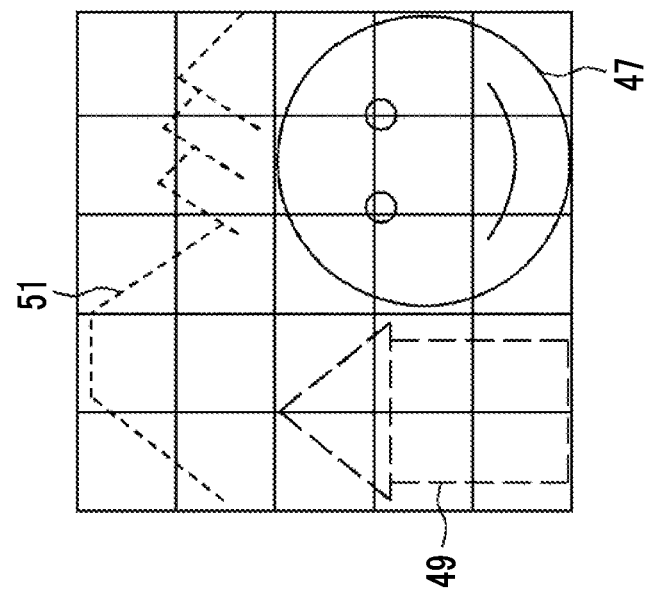
FIGS. 5A and 5B are diagrams illustrating the calculation of a signal ratio.
Figure 5A:
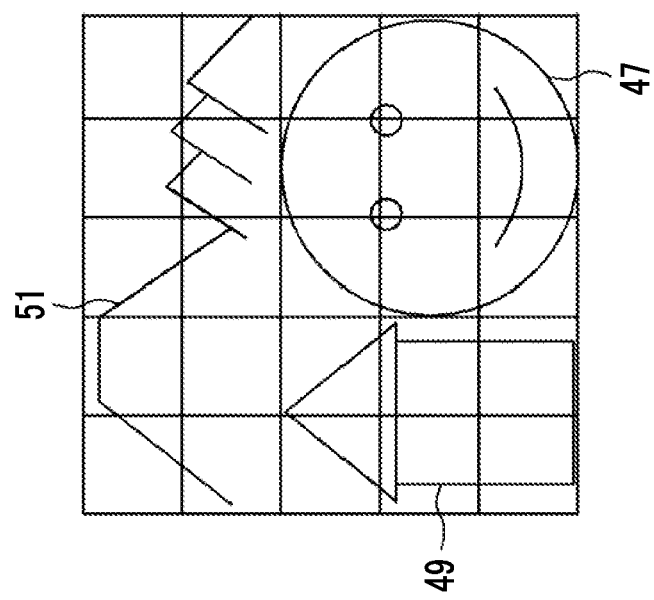

FIGS. 5A and 5B are conceptual diagrams illustrating the first flash emission image and the second flash emission image. The captured first flash emission image illustrated in FIG. 5A includes a main object 47 which is the face of a person with a short object distance, an intermediate object 49 which is a structure with a relatively long object distance, a background 51 which is a mountain with a very long object distance. The first flash emission image illustrated in FIG. 5A is captured by the main imaging operation with a sufficient exposure time. That is, the first flash emission image is captured with a sufficient amount of light such that blocked-up shadows do not occur in a region which is not irradiated with flash light and is irradiated with only environmental light (for example, a region including the background 51 of the mountain). For example, the first flash emission image is captured with an exposure time for which proper exposure is obtained. Here, the proper exposure is exposure other than overexposure and underexposure. However, in a case in which the first flash emission image is captured in the manual exposure mode, the first flash emission image may be underexposed or overexposed. In addition, the intermediate object 49 is, for example, an object that is regarded as the main object or the background according to the user's intention or scenes.

FIG. 5B illustrates the second flash emission image that is captured with an exposure time shorter than the exposure time of the first flash emission image. Since the second flash emission image has a short exposure time, the amount of light of the second flash emission image is less than that of the first flash emission image. In particular, the amount of light depending on the duration of the exposure time is reduced in the background 51 which is greatly affected by environmental light. In the invention, a main object region 53 and a background region 57 are determined on the basis of a difference between the amount of light of the first flash emission image and the amount of light of the second flash emission image. Therefore, the exposure time of the first flash emission image needs to be different from the exposure time of the second flash emission image. However, it is preferable that the exposure time of the first flash emission image is different from the exposure time of the second flash emission image and the exposure times are not particularly limited. For example, the exposure time of the second flash emission image may be shorter than the exposure time of the first flash emission image. It is possible to ensure the sufficiently long exposure time of the first flash emission image as the mainly captured image and the second flash emission image can be captured in a short time as the referentially captured image.

FIGS. 6A and 6B are conceptual diagrams illustrating the amount of light in each region of the first flash emission image and the second flash emission image illustrated in FIGS. 5A and 5B. FIG. 6A illustrates the amount of light in each region of the first flash emission image illustrated in FIG. 5A and FIG. 6B illustrates the amount of light in each region of the second flash emission image illustrated in FIG. 5B. FIGS. 6A and 6B include the main object region 53 in which the main object 47, which is the face of a person, is captured, an intermediate object region 55 in which the intermediate object 49, which is a structure, is captured, and the background region 57 in which the background 51, which is a mountain, is captured.

As illustrated in FIGS. 6A and 6B, each of the first flash emission image and the second flash emission image is divided into 5×5 regions A1 to A5, B1 to B5, C1 to C5, D1 to D5, and E1 to E5 and the signal ratio is calculated for each of the 5×5 regions. In each region, the amount of flash light is represented by F and the amount of environmental light is represented by L. For example, in the region A1, the amount of flash light is "1" (which is represented by F(1) in FIG. 6A), the amount of environmental light is "9" (which is represented by L(9) in FIG. 6A), and the total amount of light is "10" (which is represented by A1(10) in FIG. 6A). The amount of light is represented by various values. For example, the amount of light is represented an average brightness value in the region.

In the description of FIGS. 5A and 5B and FIGS. 6A and 6B, the image is divided into 5×5 regions. However, the invention is not limited thereto. For example, the image may be divided into m×n (m and n are integers equal to or greater than 1) regions and each region may include a plurality of pixels or one pixel.

In each of the regions A1 to A5 and B1 to B5 forming the background region 57, the amount of flash light is "1", the amount of environmental light is "9", and the total amount of light is "10". Since the object distance of the background 51, which is a mountain, is long, little flash light reaches each of the regions forming the background region 57 and each region is hardly affected by the flash light. In each of the regions C1 to C2, D1 to D2, and E1 to E2 forming the intermediate object region 55, the amount of flash light is "25", the amount of environmental light is "25", and the total amount of light is "50". Since the object distance of the intermediate object 49, which is a structure, is relatively long, the amount of flash light is "25" in each of the regions forming the intermediate object region 55. In each of the regions C3 to C5, D3 to D5, and E3 to E5 forming the main object region 53, the amount of flash light is "90", the amount of environmental light is "10", and the total amount of light is "100". Since the object distance of the main object 47 is short, the amount of flash light is "90" in each of the regions forming the main object region 53.

FIG. 6B illustrates the amount of light of the second flash emission image that is captured at a shutter speed that is 16 times higher than that of the first flash emission image. Since the shutter speed of the second flash emission image is 16 times higher than that of the first flash emission image, the amount of environmental light of the second flash emission image is $\frac{1}{16}$ of the amount of environmental light of the first flash emission image (FIG. 6A). Specifically, in the background region 57, the amount of environmental light changes from "9" to "0.56". In the intermediate object region 55, the amount of environmental light changes from "25" to "1.56". In the main object region 53, the amount of environmental light changes from "10" to "0.63". In contrast, there is no change in the amount of flash light between the first flash emission image and the second flash emission image since the shutter speed of the first flash emission image and the second flash emission image is longer than the emission time of flash light. Therefore, in each region of the second flash emission image, the amount of environmental light is reduced by a value corresponding to a reduction in the shutter speed. That is, in each of the background region 57, the total amount of light in the first flash emission image is "10" and the total amount of light in the second flash emission image is "1.56". In each region of the intermediate object region 55, the total amount of light in the first flash emission image is "25" and the total amount of light in the second flash emission image is "26.56". In each region of the main object region 53, the total amount of light in the first flash emission image is "100" and the total amount of light in the second flash emission image is "96.3".

As described above, the amount of environmental light varies depending on a difference in shutter speed factor or exposure time between the first flash emission image and the second flash emission image. In the invention, the main object region 53 and the background region 57 are determined using a change in the amount of light. In FIGS. 5A and 5B and FIGS. 6A and 6B, for convenience of explanation, the main object region 53 is a region in which the main object 47 is captured. However, the main object region determined by the determination unit 45 is not limited thereto. That is, the determination unit 45 can determine the intermediate object region 55 as the main object region according to the threshold value. Similarly, the determination unit 45 can determine the intermediate object region 55 as the background region 57 according to the threshold value.

Next, the calculation of the signal ratio between the first flash emission image and the second flash emission image by the ratio calculation unit 43 will be described. Here, the signal ratio is the ratio of the image signal indicating the first flash emission image to the image signal indicating the second flash emission image. For example, the signal ratio can be the ratio of changes in the signals related to the amounts of light.

The ratio calculation unit 43 calculates the ratio (signal ratio) of the amount of light of the first image signal illustrated in FIG. 6A to the amount of light of the second image signal illustrated in FIG. 6B. The ratio calculation unit 43 can calculate the signal ratio between the first flash emission image and the second flash emission image using various methods. For example, the ratio calculation unit 43 can calculate the signal ratio between the amount of light of the first flash emission image and the amount of light of the second flash emission image using the following (Expression 1).

Signal ratio=(the amount of light of the second flash emission image/the amount of light of the first flash emission image)×100 (Expression 1)

When the signal ratio is calculated by (Expression 1), the signal ratio of the background region 57 is 15.6 (=1.56/10× 100)%, the signal ratio of the intermediate object region 55 is 53.12 (=26.56/50×100)%, and the signal ratio of the main object region 53 is 96.3 (=96.3/100×100)%.

The ratio calculation unit 43 may acquire the amounts of change in the first image signal and the second image signal in the regions and may calculate the signal ratio which is the ratio of the amount of change in the signal to a value based on the first image signal or the second image signal in each region. In this case, it is possible to accurately determine the main object region and the background region on the basis of the difference between the first flash emission image and the second flash emission image.

For example, in the case illustrated in FIGS. 6A and 6B, the ratio calculation unit 43 calculates the amount of change in the signal in each region as follows: the amount of change in the signal in the background region 57 is 8.44 (10−1.56); the amount of change in the signal in the intermediate object region 55 is 23.44 (50−26.56); and the amount of change in the signal in the main object region 53 is 3.7 (100−96.3). In addition, the ratio calculation unit 43 calculates, for example, the ratio of the amount of change in the signal to the total amount of light in each region of the first flash emission image as the signal ratio, using the following (Expression 2).

Signal ratio=(the amount of change in the signal/the amount of light of the first flash emission image)×100 (Expression 2)

When the signal ratio is calculated by (Expression 2), the signal ratio in the background region 57 is 84.44 (8.44/10× 100)%, the signal ratio in the intermediate object region 55 is 46.88 (23.44/50×100)%, and the signal ratio in the main object region 53 is 3.7 (3.7/100×100)%.

The signal ratios calculated in this way are transmitted from the ratio calculation unit 43 to the determination unit 45. The determination unit 45 determines the main object region 53 and the background region 57 on the basis of the signal ratios and the threshold value. The main object region 53 determined by the determination unit 45 means, for example, a region for which the user wants to perform main object image processing and the background region 57 determined by the determination unit 45 means, for example, a region for which the user wants to perform background image processing. The user can set a threshold value to direct the determination unit 45 to determine a desired region.

<For Threshold Value>

Next, the threshold value used by the determination unit 45 to determine the main object region 53 and the background region 57 will be described. A method for determining the threshold value is not particularly limited. Various methods can be used in the range in which the main object region 53 and the background region 57 for that the user wants to perform image processing are determined. The threshold value may be stored in, for example, the control memory 30 of the digital camera 2 in advance or the user may directly input the threshold value.

For example, the threshold value is calculated on the basis of the fact that the influence of flash light is constant between the first flash emission image and the second flash emission image and the amount of environmental light varies depending on the ratio of the exposure time of the first flash emission image to the exposure time of the second flash emission image, and an arbitrary percentage of the amount of flash light.

An example of the threshold value will be described with reference to FIGS. 7 to 12 which are diagrams illustrating the ratio of the brightness of the first flash emission image to the brightness of the second flash emission image. In FIGS. 7 to 12, the vertical axis indicates brightness and the horizontal axis indicates a shutter speed factor (which is represented by an "SS factor" in the drawings). In addition, brightness is represented by various known indexes. For example, brightness is represented by a brightness value. The brightness ratio illustrated in the drawings is the ratio of the brightness of a region of the second flash emission image to the brightness of a region of the first flash emission image.

FIG. 7 is a diagram illustrating a method for determining the threshold value when a region in which the percentage of the amount of flash light is equal to or greater than 40% is determined as the main object region 53. FIG. 7 illustrates a case in which the shutter speed of the second flash emission image is 1/16 of the shutter speed of the first flash emission image. Here, the shutter speed being 1/16 of the shutter speed of the first flash emission image means that the first flash emission image is captured at a shutter speed of 1/4 s and the second flash emission image is captured at a shutter speed of 1/64 s.

In the second flash emission image which is captured at a shutter speed that is 1/16 of the shutter speed of the first flash emission image, the amount of flash light is not affected by the exposure time and does not change. Therefore, the amount of flash light is maintained at 40% of the amount of flash light of the first flash emission image. In contrast, since the amount of environmental light is affected by the exposure time, the amount of environmental light is 3.75% of the amount of environmental light of the first flash emission image (1/16 of 60% of the amount of environmental light of the first flash emission image). Therefore, in a region of the second flash emission image which corresponds to a region in which the amount of flash light is 40% and the amount of environmental light is 60% in the first flash emission image, the amount of light is 43.75% (a brightness ratio of 43.75%) of the amount of light of the first flash emission image.

Therefore, when the threshold value is 43.75%, the determination unit 45 can determine a region in which the brightness ratio of the amount of flash light is equal to or greater than 40% in the first flash emission image as the main object region 53.

Figure 8:
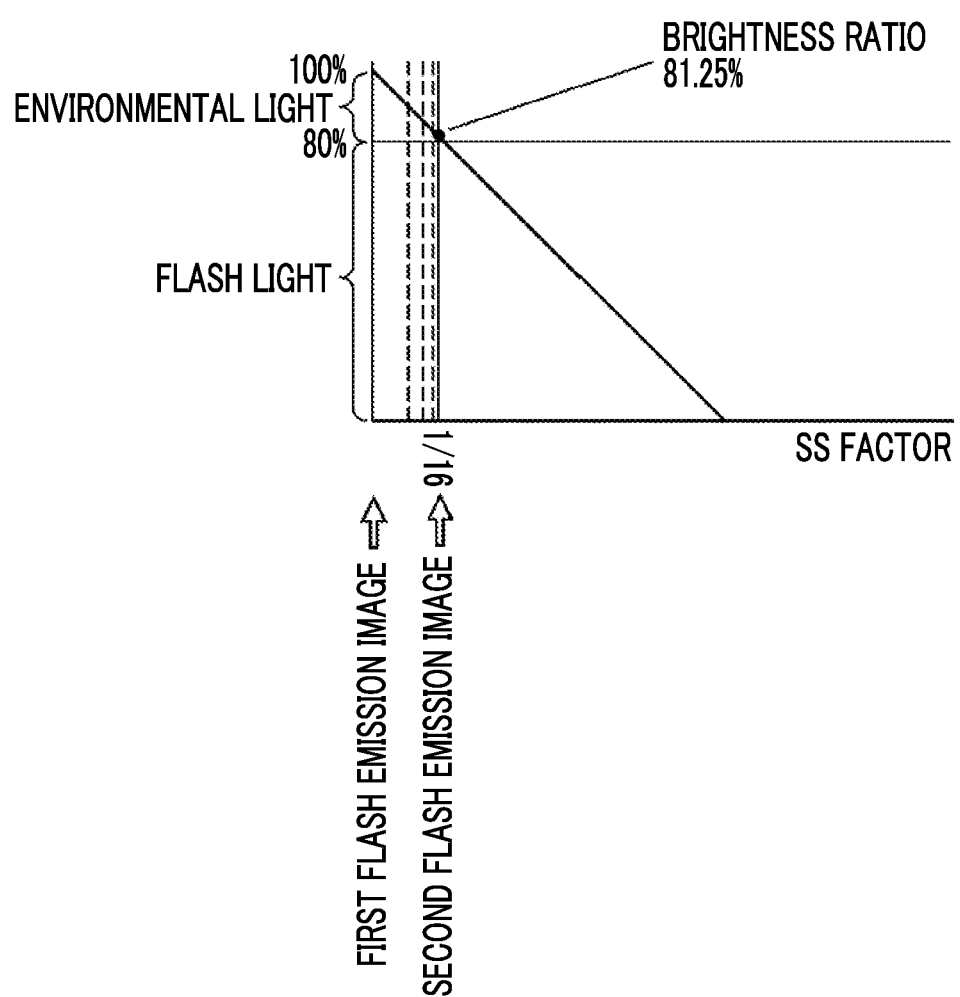
FIG. 8 is a diagram illustrating the ratio of the brightness of the first flash emission image to the brightness of the second flash emission image.

FIG. 8 is a diagram illustrating a method for determining the threshold value when a region in which the percentage of the amount of flash light is equal to or greater than 80% is determined as the main object region, using the same method as that in FIG. 7. In FIG. 8, the second flash emission image is captured at a shutter speed that is 1/16 of the shutter speed of the first flash emission image. In the second flash emission image, since the amount of flash light is not affected by the exposure time, the amount of flash light is maintained at 80% of the amount of light of the first flash emission image. In contrast, in the second flash emission image, since the amount of environmental light is affected by the exposure time, the amount of environmental light is 1.25% of the amount of environmental light of the first flash emission image (1/16 of 20% of the amount of environmental light of the first flash emission image). Therefore, in a region of the second flash emission image which corresponds to a region in which the amount of flash light is 80% and the amount of environmental light is 20% in the first flash emission image, the amount of light is 81.25% (a brightness ratio of 81.25%) of the amount of light of the first flash emission image. When the threshold value is 81.25%, the determination unit 45 can determine a region in which the brightness ratio of the amount of flash light is equal to or greater than 80% in the first flash emission image as the main object region 53.

Figure 9:
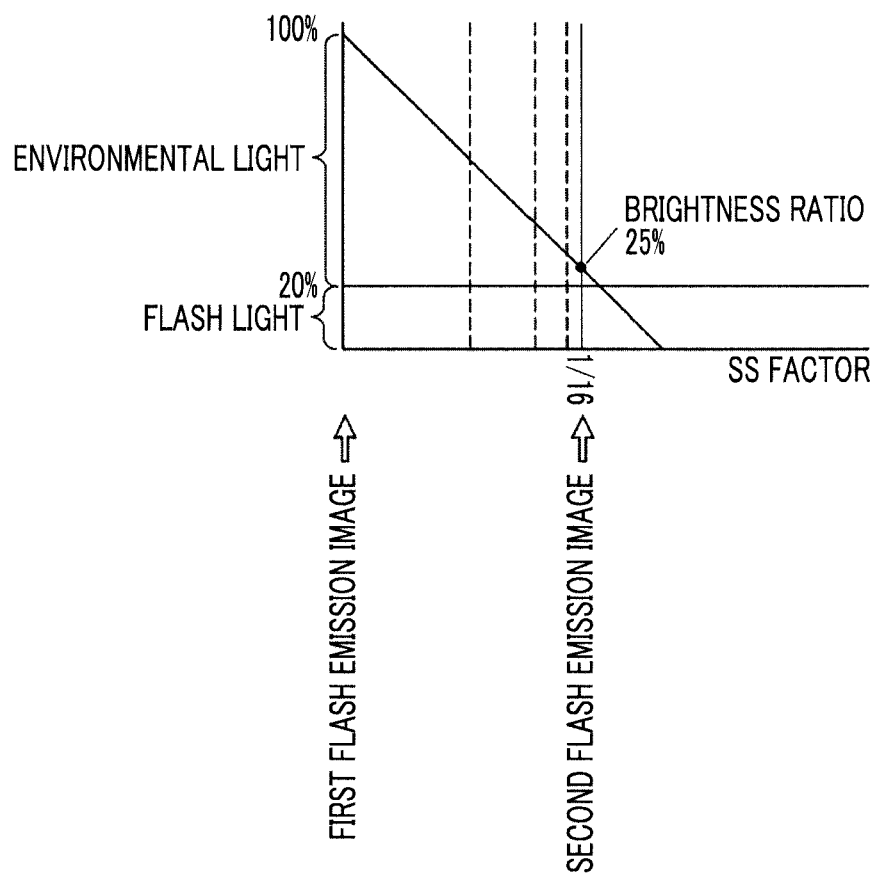
FIG. 9 is a diagram illustrating the ratio of the brightness of the first flash emission image to the brightness of the second flash emission image.

FIG. 9 is a diagram illustrating a method for determining the threshold value when a region in which the percentage of the amount of flash light is equal to or greater than 20% is determined as the main object region 53, using the same method as that in FIGS. 7 and 8. In the second flash emission image, since the amount of environmental light is affected by the exposure time, the amount of environmental light is 5% of the amount of environmental light of the first flash emission image (1/16 of 80% of the amount of environmental light of the first flash emission image). Therefore, when the threshold value is 25%, the determination unit 45 can determine a region in which the brightness ratio of the amount of flash light is equal to or greater than 20% in the first flash emission image as the main object region 53.

Figure 10:
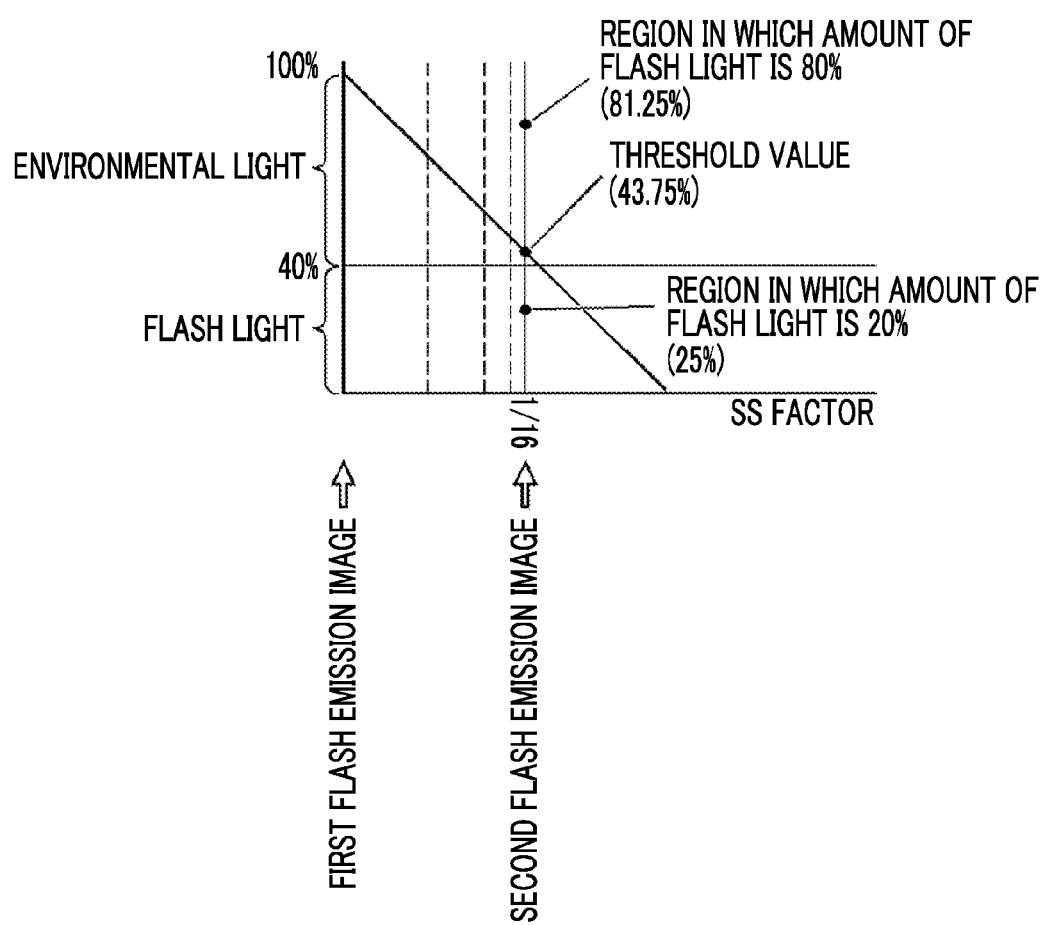
FIG. 10 is a diagram illustrating the ratio of the brightness of the first flash emission image to the brightness of the second flash emission image.

FIG. 10 illustrates the threshold value (a brightness ratio of 43.75%) for determining the region in which the amount of flash light is equal to or greater than 40% which is described in FIG. 7, the brightness ratio (81.25%) of the region in which the amount of flash light is 80% in the first flash emission image to the corresponding region of the second emission image (see FIG. 8), and the brightness ratio (25%) of the region in which the amount of flash light is 20% in the first flash emission image to the corresponding region of the second emission image (see FIG. 9).

In a case in which the determination unit 45 determines a region in which the brightness ratio is equal to or greater than the threshold value as the main object region 53 and determines a region in which the brightness ratio is less than the threshold value as the background region 57, a region in which the amount of flash light is 80% in the first flash emission image has a brightness ratio of 81.25% and is determined as the main object region 53. In contrast, a region in which the amount of flash light is 20% in the first flash emission image has a brightness ratio of 25% and is determined as the background region 57.

Figure 11:
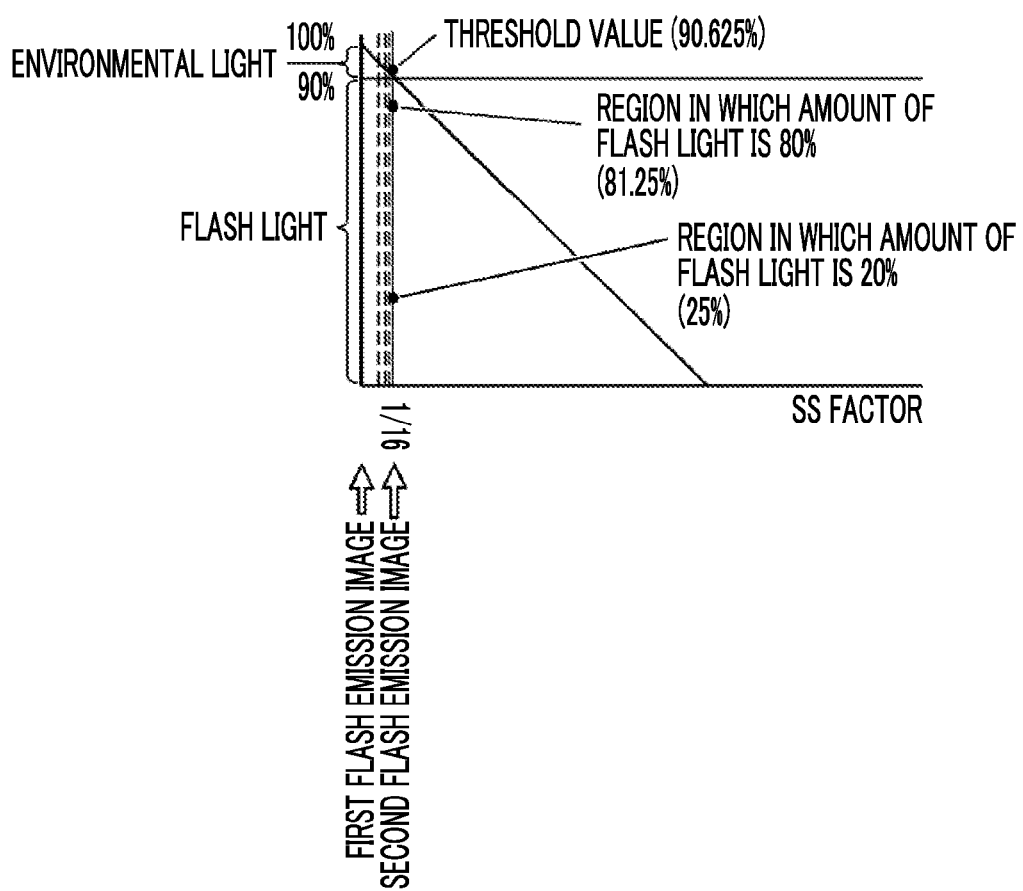
FIG. 11 is a diagram illustrating the ratio of the brightness of the first flash emission image to the brightness of the second flash emission image.

FIG. 11 illustrates a case in which the threshold value is a brightness ratio of 90.625% in FIG. 10. In a case in which the shutter speed of the second flash emission image is 1/16, the threshold value can be used to determine a region in which the amount of flash light is equal to or greater than 90% in the first flash emission image. When the determination unit 45 determines the threshold value, a region in which the amount of flash light is 80% (81.25% in the second flash emission image) and a region in which the amount of flash light is 20% (25% in the second flash emission image) are determined as the background region 57.

Figure 12:
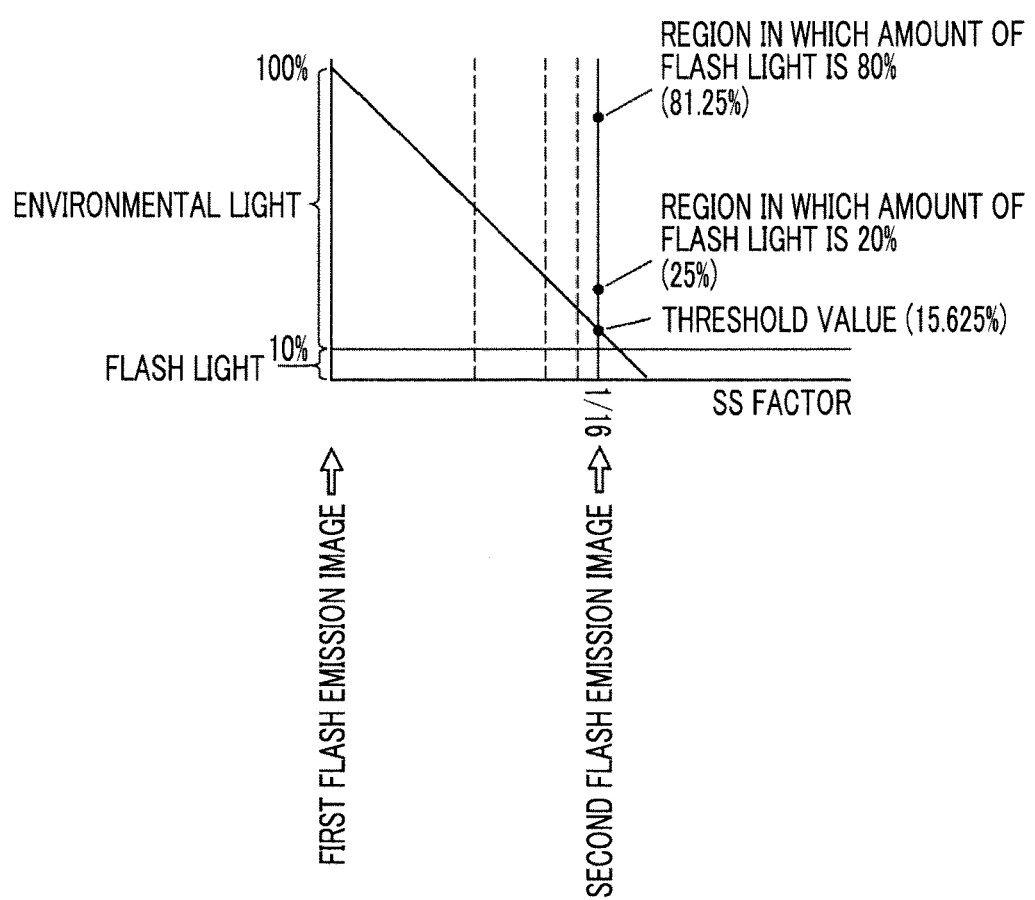
FIG. 12 is a diagram illustrating the ratio of the brightness of the first flash emission image to the brightness of the second flash emission image.

FIG. 12 illustrates a case in which the threshold value is a brightness ratio of 15.625% in FIG. 10. In a case in which the shutter speed of the second flash emission image is 1/16, the threshold value can be used to determine a region in which the amount of flash light is equal to or greater than 10% in the first flash emission image. When the determination unit 45 determines the threshold value, a region in which the amount of flash light is 80% (81.25% in the second flash emission image) and a region in which the amount of flash light is 20% (25% in the second flash emission image) are determined as the main object region 53.

As described in FIGS. 10 to 12, when the user selects an arbitrary percentage of the amount of flash light in the first flash emission image, the threshold value is calculated on the basis of the percentage and the determination unit 45 determines the main object region 53 and the background region 57 on the basis of the threshold value. Therefore, when the user selects a region according to, for example, the amount of flash light, different types of image processing can be performed in each region.

Figures 13, 14:
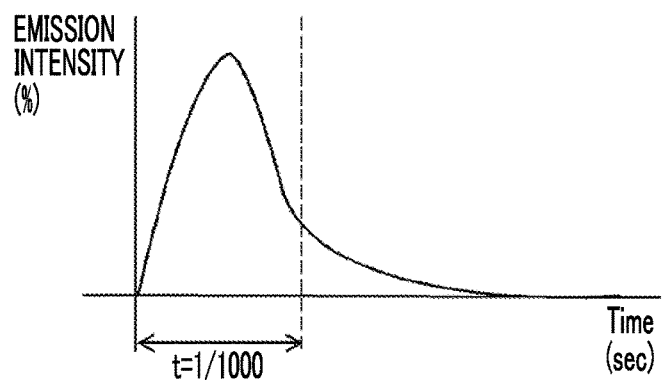
FIG. 13 is a diagram illustrating a threshold value and a shutter speed factor.
FIG. 14 is a conceptual diagram illustrating the emission intensity and emission time of flash light.

FIG. 13 is a diagram illustrating the threshold value in a case in which a region in which the amount of flash light is 40% in the first flash emission image is determined as the main object region 53 according to the shutter speed at which the second flash emission image is captured. When the shutter speed factor of the first flash emission image and the second flash emission image changes to ½, ¼, ⅛, 1/16, 1/32, 1/64, and 1/128, the threshold value (brightness ratio) becomes 70%, 55%, 47.5%, 43.75%, 41.85%, 40.9375%, and 40.46875%. The reason is that, while the amount of flash light is not affected by the exposure time and is constantly maintained at 40% of the amount of flash light of the first flash emission image, the amount of environmental light varies depending on the exposure time.

Next, the amount of flash light emitted, the emission time of flash light, and the exposure time will be described with reference to FIGS. 14 and 15.

FIG. 14 is a conceptual diagram illustrating the emission intensity and emission time of flash light. In FIG. 14, the vertical axis indicates the emission intensity of flash light and the horizontal axis indicates time. FIG. 14 illustrates the relationship between the general emission intensity of a xenon lamp and time. In general, when the exposure time is 1/1000 seconds, it is possible to receive a sufficient amount of flash light. FIG. 14 is a diagram related to the xenon lamp. However, the lamp is not particularly limited to the xenon lamp as long as it can emit flash light. For example, a flash device using a light emitting diode (LED) may be used.

Figure 15:
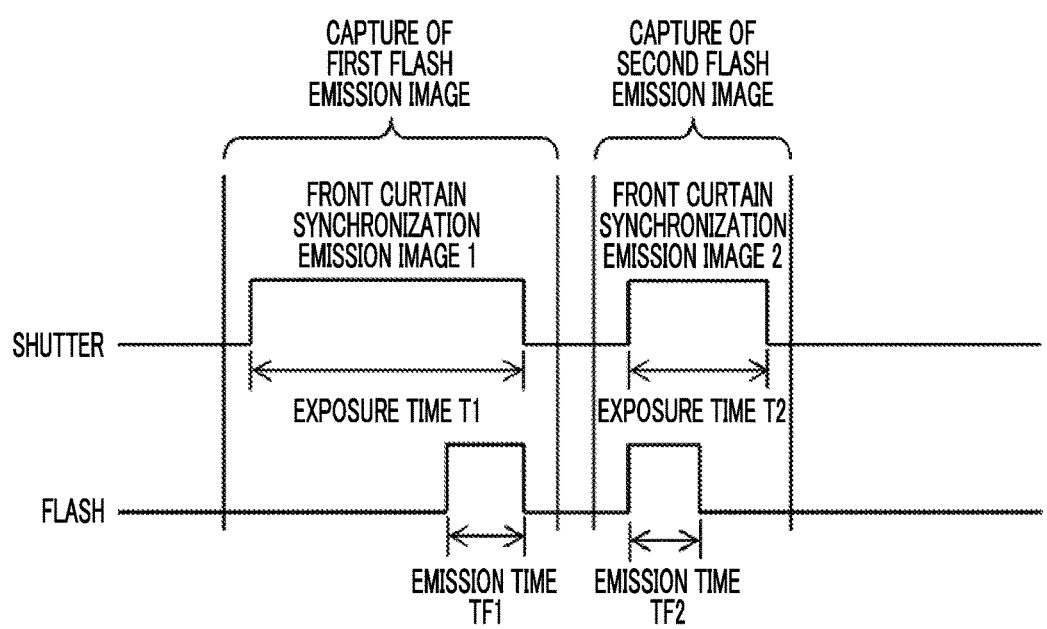
FIG. 15 is a timing chart illustrating an exposure time and the emission time of flash light.

FIG. 15 is a timing chart illustrating the exposure time and the emission time of flash light. The first flash emission image is captured with an exposure time T1 and at an emission time TF1 of flash light and the second flash emission image is captured with an exposure time T2 and at an emission time TF2 of flash light.

In a case in which the exposure time T2 is shorter than the exposure time T1, it is possible to ensure a sufficient exposure time in the first flash emission image (main imaging image). In addition, since the exposure time T1 is set to be longer than the emission time TF1 of flash light and the exposure time T2 is set to be longer than the emission time TF2 of flash light, it is possible to acquire a sufficient amount of flash light and to acquire a large amount of environmental. The exposure time T1 is not particularly limited. However, it is preferable to set the exposure time such that proper exposure is obtained since the first flash emission image is an image captured by the main imaging operation.

In the case illustrated in FIG. 15, flash light is emitted at an emission time (flash emission time) corresponding to rear curtain synchronization when the first flash emission image is captured and flash light is emitted at an emission time corresponding to front curtain synchronization when the second flash emission image is captured. When the first flash emission image and the second flash emission image are captured according to the emission time of flash light, the interval between a first flash light emission operation and a second flash light emission operation is shortened and a change in the main object or a scene is reduced. Therefore, the use of the first flash emission image and the second flash emission image captured at the flash emission time illustrated in FIG. 15 makes it possible to accurately determine the main object region 53 and the background region 57.

The emission time of flash light of the first flash emission image is not limited to the rear curtain synchronization and may be front curtain synchronization (front curtain synchronization setting). In addition, the emission time of flash light of the second flash emission image is not limited to the front curtain synchronization and may be rear curtain synchronization (rear curtain synchronization setting). For example, in a case in which the second flash emission image and the first flash emission image are continuously captured, the first flash emission image may be captured at a flash emission time corresponding to the front curtain synchronization and the second flash emission image may be captured at a flash emission time corresponding to the rear curtain synchronization. It is preferable that the exposure time of the second flash emission image is shorter than the exposure time of the first flash emission image and is longer than the emission time of flash light. In this case, since the time required to capture the first flash emission image as the mainly captured image is reduced, it is possible to acquire an image captured by the main imaging operation that the user intends. In addition, in a case in which the first flash emission image is captured at the flash emission time corresponding to the rear curtain synchronization and the first flash emission image and the second flash emission image are continuously captured, it is preferable that the exposure time of the second flash emission image is shorter than the exposure time of the first flash emission image and is longer than the emission time of flash light. In this case, after the first flash emission image is captured as the mainly captured image, the reference imaging operation is finished quickly. Therefore, user convenience is improved.

For example, in a case in which the first flash emission image and the second flash emission image are captured at the emission time of flash light corresponding to the front curtain synchronization, the second flash emission image is captured first as the referentially captured image and then the first flash emission image is captured as the mainly captured image. Then, when the exposure time of the second flash emission image is shorter than the exposure time of the first flash emission image, the interval between the first flash light emission operation and the second flash light emission operation is short and it is possible to prevent a change in the main object or a scene. For example, in a case in which the first flash emission image and the second flash emission image are captured at the emission time of flash light corresponding to the rear curtain synchronization, the first flash emission image is captured first as the mainly captured image and then the second flash emission image is captured as the referentially captured image. When the exposure time of the second flash emission image is shorter than the exposure time of the first flash emission image, the interval between the first flash light emission operation and the second flash light emission operation is short and it is possible to prevent a change in the main object or a scene.

In a case in which a flash device using an LED is used, when the emission time of flash light of the first flash emission image is set to the rear curtain synchronization and the emission time of flash light of the second flash emission image is set to the front curtain synchronization, flash light may be emitted for the period from the start of the emission time TF1 to the end of the emission time TF2.

It is preferable that the emission time TF1 and the emission time TF2 are set to be equal to each other. In a case in which the emission time TF1 and the emission time TF2 are equal to each other, when the same flash light (device) is used, the amounts of flash light emitted in the first flash emission image and the second flash emission image are equal to each other. Therefore, the shutter speed of the first flash emission image and the second flash emission image is sufficiently longer than the emission time of flash light. When the first shutter speed is lower than the second shutter speed, the brightness of the main object is the same and there is a difference in the brightness of the background. Therefore, the main object region 53 and the background region 57 are accurately determined. The invention is not limited to the case in which the amounts of flash light emitted in the first flash emission image and the second flash emission image are equal to each other. For example, when an image is captured by the imaging element 21 with a small amount of noise or at an ISO speed which is not affected by noise, the amount of flash light emitted in the second flash emission image may be set to half of the amount of flash light emitted in the first flash emission image and an image may be captured at an ISO speed that is one level higher than the ISO speed of the first flash emission image. In this case, even if the first flash emission image and the second flash emission image are captured with the same amount of flash light, it is possible to accurately determine the main object region 53 and the background region 57. In addition, in this aspect, it is possible to reduce the consumption of a battery and to shorten the time required to the charging time of a capacitor.

In FIG. 15, there is a time interval between the exposure time T1 and the exposure time T2. In the case of a rolling shutter CMOS sensor, it is preferable that, for example, a global shutter sensor is used to bring the interval close to zero. For example, when imaging starts, a mechanical shutter is opened. The first exposure is ended by the global shutter of the sensor. When second exposure ends, the mechanical shutter is closed. In this case, the time interval between the first exposure time and the second exposure time is substantially zero.

Figure 16:
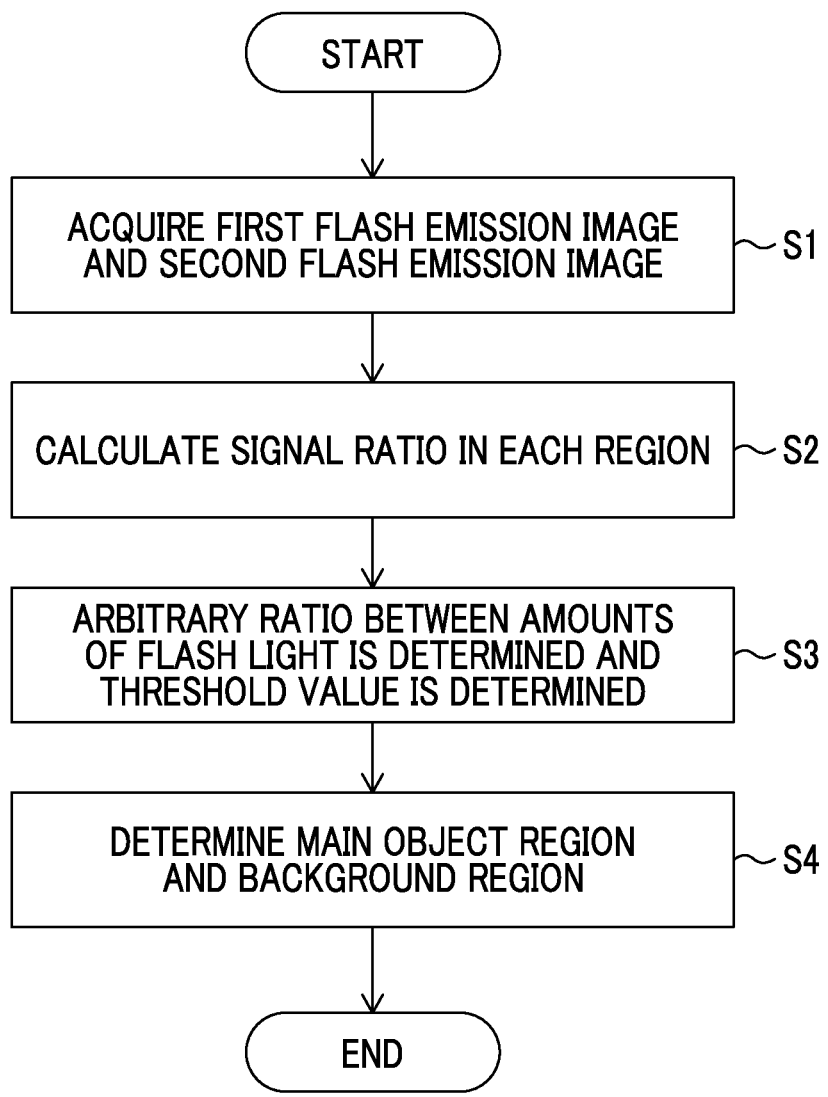
FIG. 16 is a flowchart illustrating the operation of the image processing unit according to the first embodiment.

FIG. 16 is a flowchart illustrating the operation of the image processing device according to the first embodiment. First, the image acquisition unit 41 acquires the first flash emission image and the second flash emission image having different exposure times (Step S1: an image acquisition step). Then, the ratio calculation unit 43 calculates a signal ratio from the amount of light in each region of the first flash emission image and the total amount of light (the amount of flash light and the amount of environmental light) in each region of the second flash emission image (Step S2: a ratio calculation step). For example, the signal ratio may be the ratio of the brightness of each region of the second flash emission image to the brightness of each region of the first flash emission image, that is, a brightness ratio. Then, when the user determines an arbitrary percentage of the amount of flash light, a threshold value is determined on the basis of the shutter speed factor of the first flash emission image and the second flash emission image (Step S3). Then, the determination unit 45 determines whether each region of the first flash emission image is the main object region 53 or the background region 57 on the basis of the threshold value (Step S4: a determination step).

As described above, the image processing device according to the invention determines the main object region 53 and the background region 57 on the basis of the ratio of changes in two flash emission images obtained by capturing the same scene while emitting flash light. Therefore, the influence of noise, the influence of the shaking of an object, and the influence of a camera shake are reduced and it is possible to appropriately determine the main object region 53 and the background region 57. According to this aspect, since the image obtained by the main imaging operation is also used to determine the main object region and the background region, it is possible to determine the regions using two imaging operations including the main imaging operation.

Second Embodiment

A second embodiment of the invention will be described. In the second embodiment of the invention, different types of signal processing are performed for the main object region 53 and the background region 57 determined by the determination unit 45.

Figure 17:
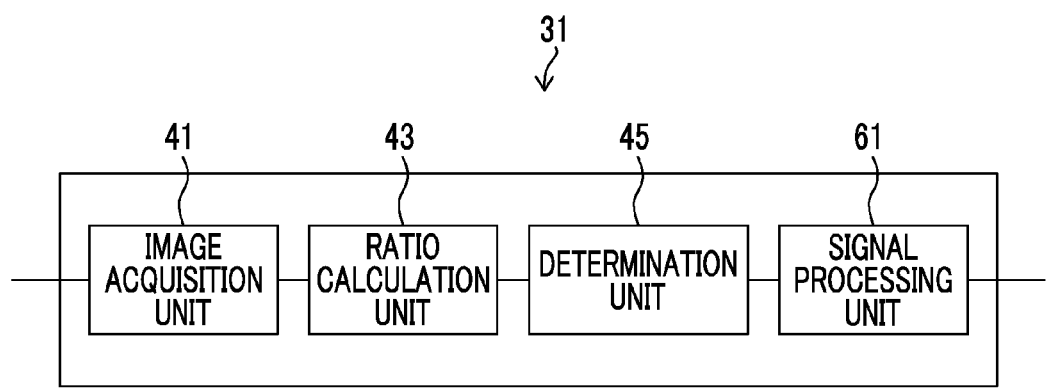
FIG. 17 is a block diagram illustrating an image processing unit according to a second embodiment.

FIG. 17 is a block diagram illustrating an image processing unit 31 according to the second embodiment. The image processing unit 31 according to the second embodiment comprises an image acquisition unit 41, a ratio calculation unit 43, a determination unit 45, and a signal processing unit 61. The same blocks as those described in FIG. 4 are denoted by the same reference numerals and the description thereof will not be repeated.

The signal processing unit 61 performs different types of signal processing for the main object region 53 and the background region 57 determined by the determination unit 45. In some cases, the characteristics of an image are different in the main object region 53 and the background region 57. Therefore, when different types of signal processing are performed for the main object region 53 and the background region 57, it is possible to appropriately perform signal processing.

The signal processing unit 61 performs, for example, different types of WB processing for the main object region 53 and the background region 57. That is, the signal processing unit 61 performs multi-area WB processing for the first flash emission image and performs WB processing which applies different WB gains to the main object region 53 and the background region 57. Since WB processing which applies different WB gains to the main object region 53 and the background region 57 is performed, it is possible to cancel the influence of flash light in the main object region 53 and to cancel the influence of environmental light in the background region 57.

As described above, in the second embodiment, the signal processing unit 61 changes signal processing according to the determination result of the main object region 53 and the background region 57 by the determination unit 45. Therefore, it is possible to perform signal processing corresponding to the characteristics of an image.

Third Embodiment

A third embodiment of the invention will be described. In the third embodiment of the invention, the signal processing of the signal processing unit 61 described in the second embodiment is not performed according to conditions or the main object region 53 and the background region 57 is not performed using the first flash emission image and the second flash emission image, according to conditions.

For example, in a case in which, since a main object moves fast, it is difficult to accurately determine the a main object, or in a case in which, since the shutter speed can be sufficiently increased, it is not necessary to perform the determination process according to the invention, the signal processing unit 61 does not perform different types of signal processing for the main object region 53 and the background region 57. For example, in a case in which a camera shake occurs and it is difficult to accurately perform the determination process or in a case in which a remaining battery level is low, the determination unit 45 does not perform the determination process. In a case in which the determination unit 45 does not perform the above-mentioned determination process, the main object region 53 and the background region 57 may be determined by a known method. The known method for determining the main object region 53 and the background region 57 is, for example, the method which has been described as the technique according to the related art in the invention.

The signal processing unit 61 determines whether to perform different types of signal processing for the main object region 53 and the background region 57, or the system control unit 25 (see FIG. 3) directs the signal processing unit 61 to determine whether to perform different types of signal processing for the main object region 53 and the background region 57. In addition, the determination unit 45 determines whether to determine the main object region 53 and the background region 57 from the first flash emission image and the second flash emission image or the system control unit 25 (see FIG. 3) directs the determination unit 45 to determine whether to determine the main object region 53 and the background region 57 from the first flash emission image and the second flash emission image.

<In Case in Which Main Object Moves Fast>

In a case in which a main object moves fast, the positional deviation of the main object may occur in the first flash emission image and the second flash emission image and the ratio of a change in the amount of light of the first flash emission image to a change in the amount of light of the second flash emission image may not be accurately calculated. Therefore, in a case in which the main object moves fast, the signal processing unit 61 does not perform different types of signal processing for the main object region 53 and the background region 57.

The speed (moving speed) of the main object can be detected by various methods. For example, the moving speed of the main object may be detected by the comparison between the brightness information of the first flash emission image and the brightness information of the second flash emission image.

Figure 18:
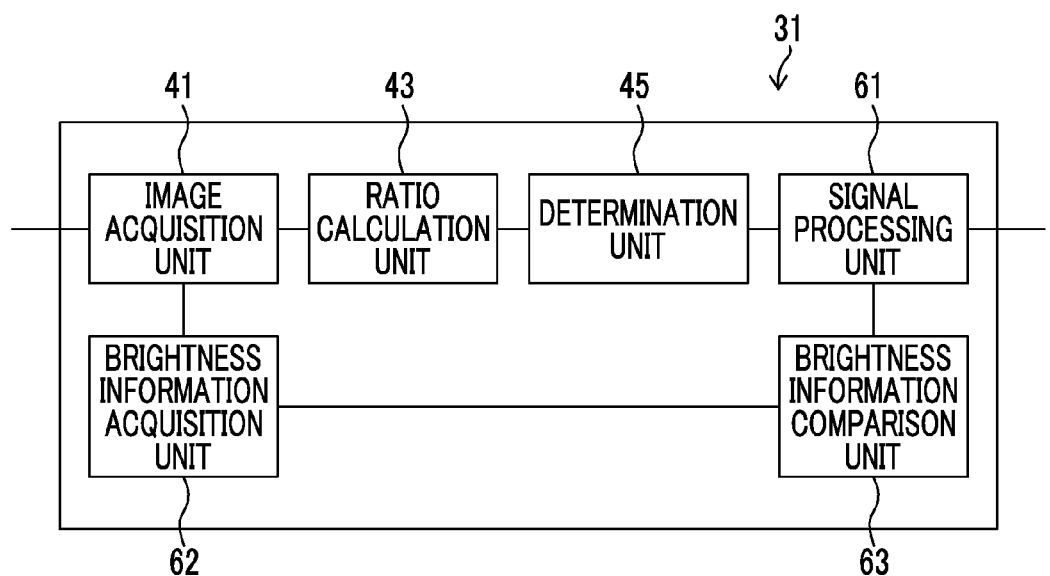
FIG. 18 is a block diagram illustrating an image processing unit according to a third embodiment.

FIG. 18 illustrates a case in which the image processing unit 31 described in FIG. 17 further includes a brightness information acquisition unit 62 and a brightness information comparison unit 63. The same blocks as those illustrated in FIG. 4 and FIG. 17 are denoted by the same reference numerals and the description thereof will not be repeated.

The brightness information acquisition unit 62 acquires the brightness information of the first flash emission image and the second flash emission image acquired by the image acquisition unit 41. The brightness information acquisition unit 62 can acquire the brightness information from the first flash emission image and the second flash emission image, using various methods. Here, the brightness information means various kinds of information related to brightness. For example, the brightness information is a brightness value or a histogram.

Figure 19A:
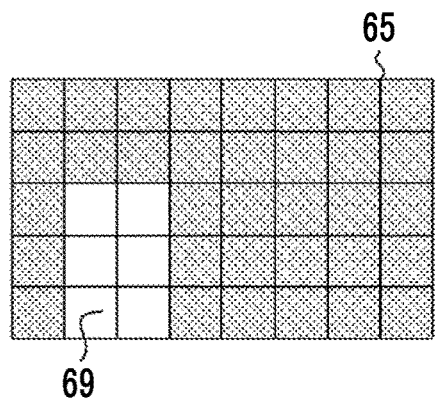
FIGS. 19A and 19B are conceptual diagrams illustrating an example of brightness information.
Figure 19B:
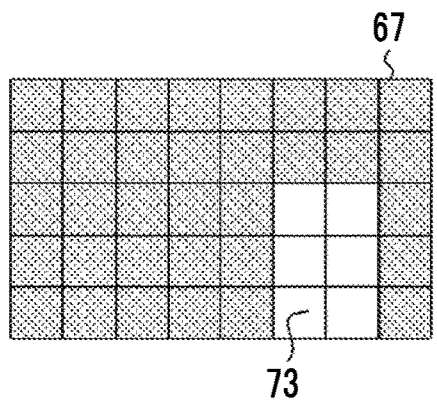

FIGS. 19A and 19B are diagrams illustrating an example of the brightness information acquired by the brightness information acquisition unit 62. The brightness information illustrated in FIG. 19A is brightness information 65 related to the first flash emission image. The brightness information illustrated in FIG. 19B is brightness information 67 related to the second flash emission image. In the brightness information 65 illustrated in FIG. 19A, a region 69 having a brightness value that is equal to or greater than a certain value (threshold value) is extracted. In the brightness information 67 illustrated in FIG. 19B, a region 73 having a brightness value that is equal to or greater than the same value as that in FIG. 19A is extracted. In a case in which an image is captured while flash light is emitted, since the main object mainly reflects flash light, the region 69 and the region 73 having a brightness value that is equal to or greater than a certain value can be considered as an image region in which the main object is captured. Therefore, the overlap between the region 69 having a brightness value that is equal to or greater than a certain value in the first flash emission image and the region 73 having a brightness value that is equal to or greater than a certain value in the second flash emission image is checked to detect whether the main object moves. The certain value (threshold value) is determined in order to extract the brightness information of the main object. Here, the term "overlap" means the positional overlap between regions having a brightness value that is equal to or greater than a certain value.

The brightness information comparison unit 63 compares the brightness information items acquired by the brightness information acquisition unit 62 and transmits the comparison result to the determination unit 45. Specifically, the positions of the region 69 illustrated in FIG. 19A and the position of the region 73 illustrated in FIG. 19B is compared to calculate an overlap percentage. In the case illustrated in FIGS. 19A and 19B, the overlap between the region 69 and the region 73 is 0%.

The result of the comparison between the region 69 and the region 73 is an overlap percentage of 0% and the brightness information comparison unit 63 transmits the comparison result to the signal processing unit 61. The signal processing unit 61 determines whether to perform signal processing on the basis of the comparison result acquired from the brightness information comparison unit 63. For example, in a case in which the overlap percentage is equal to or greater than 0% and equal to or less than 50%, the signal processing unit 61 does not determine the main object region 53 and the background region 57, using the first flash emission image and the second flash emission image, since the moving speed of the main object is high.

<In Case in Which Shutter Speed Can Be Increased>

In a case in which it is possible to acquire an image with a sufficient amount of light even if an imaging environment is sufficiently bright and the shutter speed is high, blurring is not likely to occur in two images captured without emitting flash light. Therefore, the signal processing unit 61 may not perform different types of signal processing for the main object region 53 and the background region 57 obtained from two flash emission images (the first flash emission image and the second flash emission image). In a case in which a focal-plane shutter is used and an image is captured at a high shutter speed while flash light is emitted, when a first image is acquired, the curtain starts to move down and then a second curtain starts to move down. As a result, flash light does not uniformly reach the entire imaging surface. Therefore, when flash light is emitted, brightness unevenness occurs. For this reason, in a case in which it is possible to acquire an image with a sufficient amount of light even if the shutter speed is high, the signal processing unit 61 does not perform different types of signal processing for the main object region 53 and the background region 57.

<In Case in Which Camera Shake Occurs>

In a case in which blurring occurs in the first flash emission image and the second flash emission image due to a camera shake, the ratio calculation unit 43 inaccurately calculate the change ratio. Therefore, the determination unit 45 does not determine the main object region 53 and the background region 57 on the basis of the detection result of a camera shake by the camera shake sensor 70 (see FIG. 3) of the digital camera 2. Therefore, in this aspect, it is possible to prevent the calculation of an inaccurate change ratio.

<In Case in Which Remaining Battery Level Is Low>

In a case in which the remaining battery level of the digital camera 2 is low, the determination unit 45 may not determine the main object region 53 and the background region 57. In the digital camera 2, since the determination unit 45 does not perform the determination process, it is possible to reduce the consumption of the battery and to increase the left of the battery. Therefore, the user convenience of the digital camera 2 is improved.

As described above, in the third embodiment, in some cases, the signal processing unit 61 does not perform different types of signal processing for the main object region 53 and the background region 57 or the determination unit 45 does not determine the main object region 53 and the background region 57. Therefore, the quality of the signal processing performed by the signal processing unit 61 is improved and it is possible to improve the accuracy of the determination performed by the determination unit 45.

Each of the above-mentioned functional structures can be implemented by any hardware, software, or a combination thereof. For example, the invention can also be applied to a program that causes a computer to perform an image processing method (image processing process) in each of the above-mentioned devices and processing units (for example, the image processing unit 31), a computer-readable storage medium (non-transitory storage medium) that stores the program, or a computer in which the program can be installed.

The aspect to which the invention can be applied are not limited to the digital camera 2. The invention can also be applied to cameras having an imaging function as a main function and mobile devices having functions (a calling function, a communication function, and other computer functions) other than the imaging function, in addition to the imaging function. Other aspects to which the invention can be applied are, for example, mobile phones, smart phones, personal digital assistants (PDAs), and portable game machines with a camera function. Hereinafter, an example of the smart phone to which the invention can be applied will be described.

<Structure of Smart Phone>

Figure 20:
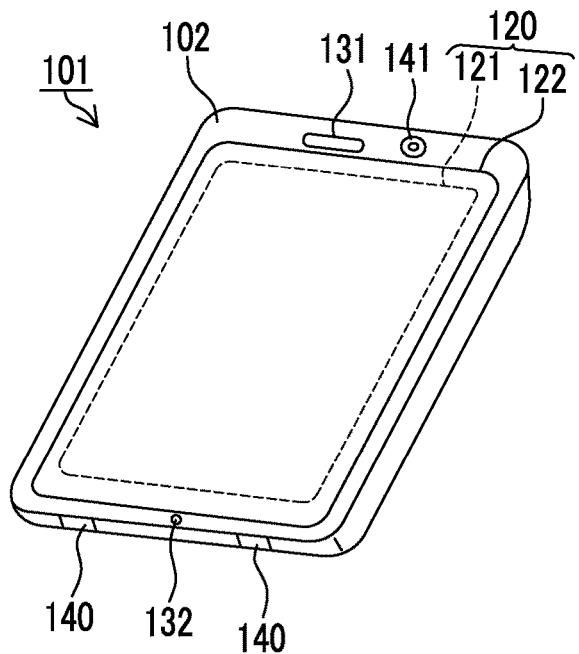
FIG. 20 is a diagram illustrating the outward appearance of a smart phone.

FIG. 20 is a diagram illustrating the outward appearance of a smart phone 101. The smart phone 101 illustrated in FIG. 20 comprises a housing 102 with a flat panel shape and a display input unit 120 having a display panel 121 as a display unit and an operation panel 122 as an input unit which are integrally formed on one surface of the housing 102. The housing 102 comprises a speaker 131, a microphone 132, an operating unit 140, and a camera unit 141. However, the configuration of the housing 102 is not limited thereto. For example, the display unit and the input unit may be independently provided, or the housing 102 may have a folding structure or a sliding structure.

Figure 21:
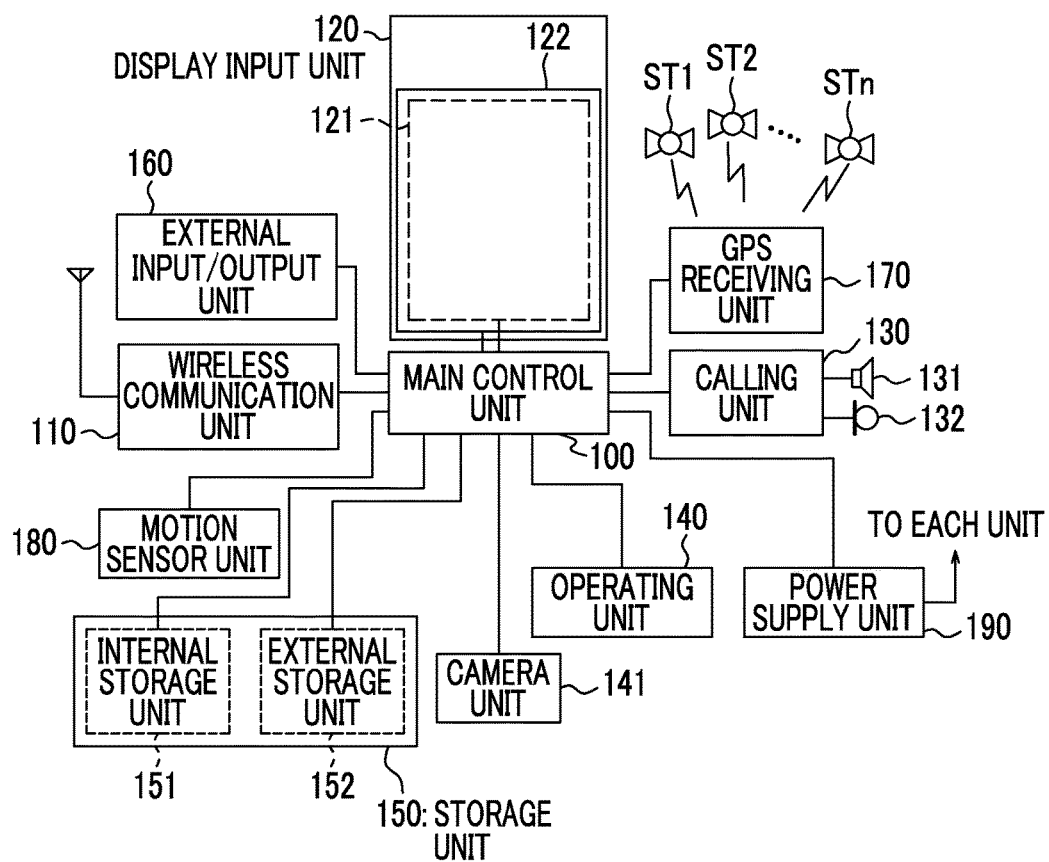
FIG. 21 is a block diagram illustrating the structure of the smart phone illustrated in FIG. 20.

FIG. 21 is a block diagram illustrating the structure of the smart phone 101 illustrated in FIG. 20. As illustrated in FIG. 21, the smart phone 101 comprises, as main components, a wireless communication unit 110, the display input unit 120, a calling unit 130, the operating unit 140, the camera unit 141, a storage unit 150, an external input/output unit 160, a global positioning system (GPS) receiving unit 170, a motion sensor unit 180, a power supply unit 190, and a main control unit 100. The smart phone 101 has, as a main function, a wireless communication function which performs mobile wireless communication through a base station apparatus BS and a mobile communication network NW.

The wireless communication unit 110 performs wireless communication with the base station apparatus BS which is accommodated in the mobile communication network NW in response to an instruction from the main control unit 100. The wireless communication is used to transmit and receive various types of file data, such as voice data and image data, and electronic mail data or to receive, for example, web data and streaming data.

The display input unit 120 is a so-called touch panel that displays, for example, images (still images and moving images) or text information to visually transmit information to a user and detects the user's operation for the displayed information under the control of the main control unit 100 and comprises the display panel 121 and the operation panel 122.

The display panel 121 uses, for example, a liquid crystal display (LCD) or an organic electro-luminescence display (OELD) as a display device. The operation panel 122 is a device that is provided such that an image displayed on a display surface of the display panel 121 is visually recognized and detects coordinates operated by a finger of the user or a stylus. When the device is operated by a finger of the user or a stylus, a detection signal which is generated by the operation is output to the main control unit 100. Then, the main control unit 100 detects an operation position (coordinates) on the display panel 121 on the basis of the received detection signal.

As illustrated in FIG. 20, the display panel 121 and the operation panel 122 of the smart phone 101 which is an embodiment of the imaging device according to the invention are integrated to form the display input unit 120 and the operation panel 122 is arranged so as to completely cover the display panel 121. In a case in which this arrangement is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 20, for example, the speaker 131 can be mounted on the same surface as the display input unit 120 and the microphone 132 can be mounted on a side surface of the housing 102.

The operating unit 140 is a hardware key which uses, for example, a key switch and receives instructions from the user. For example, as illustrated in FIG. 20, the operating unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, and downloaded content data. In addition, the storage unit 150 temporarily stores, for example, streaming data. The storage unit 150 includes an internal storage unit 151 which is provided in the smart phone and an external storage unit 152 which has an attachable and detachable external memory slot. The internal storage unit 151 and the external storage unit 152 forming the storage unit 150 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) communication or IEEE1394 communication) or a network (for example, the Internet, a wireless LAN, a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card or a subscriber identity module (SIM) card/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit may transmit data which is received from the external apparatus to each component of the smart phone 101 or may transmit data in the smart phone 101 to the external apparatus.

The GPS receiving unit 170 receives GPS signals transmitted from GPS satellites ST1 to STn and performs a position measurement process on the basis of the received GPS signals to detect a position including the latitude, longitude, and height of the smart phone 101, in response to an instruction from the main control unit 100. In a case in which the GPS receiving unit 170 can acquire positional information from the wireless communication unit 110 or the external input/output unit 160 (for example, the wireless LAN), the GPS receiving unit 170 can detect the position using the positional information.

The motion sensor unit 180 comprises, for example, a triaxial acceleration sensor and detects the physical movement of the smart phone 101 in response to an instruction from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to an instruction from the main control unit 100.

The main control unit 100 comprises a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays an image on the display input unit 120 on the basis of image data (still image or moving image data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operating unit 140 and the operation panel 122.

The main control unit 100 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 121.

The main control unit 100 performs the operation detection control to detect the operation of the user input through the operating unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which electronically captures an image using an imaging element such as a CMOS. In addition, the camera unit 141 can convert captured image data into image data which is compressed in, for example, a JPEG format, store the converted image data in the storage unit 150, and output the converted image data through the external input/output unit 160 or the wireless communication unit 110, under the control of the main control unit 100. As illustrated in FIG. 20, the camera unit 141 is mounted on the same surface as the display input unit 120 in the smart phone 101. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 101. For example, the image captured by the camera unit 141 can be displayed on the display panel 121 or the image captured by the camera unit 141 can be used as one of the operation inputs of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the image data of a still image or a moving image and the image data may be stored in the storage unit 150 and may be output through the external input/output unit 160 or the wireless communication unit 110.

The image processing unit 31 (see FIGS. 4, 17, and 18) may be implemented by, for example, the main control unit 100.

EXPLANATION OF REFERENCES

2: digital camera
3: camera body
4: lens barrel
5: flash light emitting unit
6: shutter button
7: power switch 8: display unit
9: operating unit
10: main memory
12: lens unit
20: mechanical shutter
21: imaging element
22: process processing unit
23: A/D conversion unit
24: buffer memory
25: system control unit
26: shutter driving unit
27: lens driving unit
28: power supply control unit
29: power supply
30: control memory
31: image processing unit
32: compression and decompression unit
33: storage control unit
34: clock device
35: display control unit
36: user interface
41: image acquisition unit
43: ratio calculation unit
45: determination unit
61: signal processing unit
62: brightness information acquisition unit
63: brightness information comparison unit
100: main control unit
101: smart phone
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit

What is claimed is:

1. An image processing device comprising:
an image acquisition unit that acquires a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted;
a ratio calculation unit that calculates a ratio of the first image signal to the second image signal in each region of the second image signal corresponding to each region of the first image signal; and
a determination unit that determines a main object region and a background region in the first flash emission image on the basis of the signal ratio and a threshold value.

2. The image processing device according to claim 1, wherein the ratio calculation unit acquires an amount of change in the first image signal and the second image signal in each region of the second image signal corresponding to each region of the first image signal and calculates, as the signal ratio, a ratio of the amount of change in the signals to a value based on the first image signal or the second image signal in each region, and
the determination unit determines a region in which the signal ratio is equal to or less than the threshold value as the main object region and determines a region in which the signal ratio is greater than the threshold value as the background region in the first flash emission image.

3. The image processing device according to claim 1, wherein the determination unit determines a region in which the signal ratio is equal to or greater than the threshold value as the main object region and determines a region in which the signal ratio is less than the threshold value as the background region in the first flash emission image.

4. The image processing device according to claim 1, wherein the exposure time of the first flash emission image is longer than an emission time of the flash light.

5. The image processing device according to claim 1, wherein the exposure time of the second flash emission image is shorter than the exposure time of the first flash emission image.

6. The image processing device according to claim 1, wherein the exposure time of the first flash emission image is determined from proper exposure of the first flash emission image.

7. The image processing device according to claim 1, further comprising:
a signal processing unit that performs different types of signal processing for the main object region and the background region determined by the determination unit.

8. The image processing device according to claim 7, wherein the signal processing unit performs different types of white balance processing for the main object region and the background region.

9. The image processing device according to claim 7, further comprising:
a brightness information acquisition unit that acquires brightness information of the first flash emission image and brightness information of the second flash emission image; and
a brightness information comparison unit that compares the brightness information of the first flash emission image with the brightness information of the second flash emission image,
wherein the signal processing unit does not perform the signal processing on the basis of a comparison result of the brightness information comparison unit.

10. The image processing device according to claim 9, wherein the brightness information comparison unit calculates an overlap between the brightness information of the first flash emission image and the brightness information of the second flash emission image to perform the comparison.

11. The image processing device according to claim 7, wherein, in a case in which it is possible to acquire an image with a sufficient amount of light even if a shutter speed is high at which the first flash emission image and the second flash emission image, the signal processing unit does not perform the signal processing.

12. The image processing device according to claim 1, wherein, in a case in which the first flash emission image is captured and then the second flash emission image is captured, the first flash emission image is captured at a flash emission time corresponding to rear curtain synchronization and the second flash emission image is captured at a flash emission time corresponding to front curtain synchronization.

13. The image processing device according to claim 1, wherein, in a case in which the second flash emission image is captured and then the first flash emission image is captured, the first flash emission image is captured at a flash emission time corresponding to front curtain synchronization and the second flash emission image is captured at a flash emission time corresponding to rear curtain synchronization.

14. The image processing device according to claim 1, wherein, in a case in which the second flash emission image and the first flash emission image are captured in this order and the first flash emission image is captured at a flash emission time corresponding to front curtain synchronization, the exposure time of the second flash emission image is shorter than the exposure time of the first flash emission image.

15. The image processing device according to claim 14, wherein the second flash emission image is captured at a flash emission time corresponding to rear curtain synchronization.

16. The image processing device according to claim 1, wherein, in a case in which the first flash emission image and the second flash emission image are captured in this order and the first flash emission image is captured at a flash emission time corresponding to rear curtain synchronization, the exposure time of the second flash emission image is shorter than the exposure time of the first flash emission image.

17. The image processing device according to claim 16, wherein the second flash emission image is captured at a flash emission time corresponding to front curtain synchronization.

18. The image processing device according to claim 1, wherein the amount of flash light emitted is set to the same value in the first flash emission image and the second flash emission image.

19. The image processing device according to claim 1, wherein each region of the first image signal and the second image signal is one pixel.

20. An imaging device comprising the image processing device according to claim 1.

21. The imaging device according to claim 20, further comprising:
a camera shake sensor that detects a camera shake,
wherein, in a case in which at least one of the first flash emission image and the second flash emission image is captured and the camera shake sensor detects the camera shake, the determination unit does not determine the main object region and the background region.

22. An image processing method comprising:
an image acquisition step of acquiring a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted;
a ratio calculation step of calculating a ratio of the first image signal to the second image signal in each region of the second image signal corresponding to each region of the first image signal; and
a determination step of determining a main object region and a background region in the first flash emission image on the basis of the signal ratio and a threshold value.

23. A non-transitory computer-readable tangible recording medium storing a program that causes a computer to perform:
an image acquisition step of acquiring a first image signal indicating a first flash emission image which is captured by a main imaging operation while flash light is emitted and a second image signal indicating a second flash emission image which is obtained by capturing the same scene as that of the first flash emission image with an exposure time different from an exposure time of the first flash emission image, using a reference imaging operation, while the flash light is emitted;
a ratio calculation step of calculating a ratio of the first image signal to the second image signal in each region of the second image signal corresponding to each region of the first image signal; and
a determination step of determining a main object region and a background region in the first flash emission image on the basis of the signal ratio and a threshold value.

* * * * *